United States Patent [19]

Saitoh

[11] Patent Number: 5,907,631
[45] Date of Patent: *May 25, 1999

[54] DOCUMENT IMAGE PROCESSING METHOD AND SYSTEM HAVING FUNCTION OF DETERMINING BODY TEXT REGION READING ORDER

[75] Inventor: Takashi Saitoh, Yokohama, Japan

[73] Assignee: Ricoh Company, Ltd., Tokyo, Japan

[*] Notice: This patent is subject to a terminal disclaimer.

[21] Appl. No.: 09/088,773

[22] Filed: Jun. 2, 1998

Related U.S. Application Data

[63] Continuation of application No. 08/516,686, Aug. 18, 1995, Pat. No. 5,774,580, which is a continuation of application No. 08/241,999, May 12, 1994, abandoned.

[30] Foreign Application Priority Data

| May 12, 1993 | [JP] | Japan | 5-110397 |
| Nov. 18, 1993 | [JP] | Japan | 5-288960 |
| Dec. 24, 1993 | [JP] | Japan | 5-327015 |

[51] Int. Cl.⁶ ............................................. G06K 9/34
[52] U.S. Cl. .................. 382/176; 382/224; 382/317
[58] Field of Search ............................. 382/173, 176, 382/175, 224, 317

[56] References Cited

U.S. PATENT DOCUMENTS

| 4,856,074 | 8/1989 | Nagaoko . |
| 5,048,109 | 9/1991 | Bloomberg et al. . |
| 5,073,953 | 12/1991 | Westdijk . |
| 5,119,437 | 6/1992 | Kuwamura et al. . |
| 5,185,813 | 2/1993 | Tsujimoto . |
| 5,278,918 | 1/1994 | Bernzott et al. . |
| 5,369,716 | 11/1994 | Sangu . |
| 5,774,580 | 6/1998 | Saitoh ............................. 382/176 |

FOREIGN PATENT DOCUMENTS

| 1-183784 | 7/1989 | Japan . |
| 3-269689 | 12/1991 | Japan . |
| 5-81475 | 4/1993 | Japan . |

OTHER PUBLICATIONS

1993 IEEE article Block Segmention and Text Area Examination of Vertical/Horizontal Written Document, written by Naohiro Amamoto, Shin Torigoe, and Yoshitaka Hirogaki, pp. 739–742.

The Japanese Book Information Processing Handbook first published on May 1989, edited by the Information Processing Society, published by Ohm, p. 26, Fig. 1.9 Tree Tracing Method, (a) Preorder.

*Primary Examiner*—Phuoc Tran
*Attorney, Agent, or Firm*—McDermott, Will & Emery

[57] ABSTRACT

An extracting step extracts text regions from an input document image. A classifying step classifies the text regions into in-order reading regions to be successively read in the predetermined order and different-attribute regions. A detecting step detects the construction of the in-order reading regions. A determining step determines the reading order, in which the in-order reading regions are to be read, using the construction. The detecting step detects the construction in a manner that is the same whether the input document image comprises a vertically typeset document or a horizontally typeset document. The detecting step further includes a tree graph formation step c-1) forming a tree graph representing the construction including nodes respectively representing the in-order reading regions.

33 Claims, 13 Drawing Sheets

DOCUMENT IMAGE PROCESSING METHOD AND SYSTEM HAVING FUNCTION OF DETERMINING BODY TEXT REGION READING ORDER

This application is a continuation of application Ser. No. 08/516,686, filed Aug. 18, 1995. now U.S. Pat. No. 5,774,580 which is a continuation of application Ser. No. 08/241,999 filed May 12, 1994 abandoned.

BACKGROUND OF THE INVENTION

1. Field of the Invention

The present invention relates to a document image processing method and system having functions of extracting text regions comprising a plurality of regions, then detecting the construction of the thus extracted text regions and then determining the reading order in which the plurality of regions in the text regions are to be read.

2. Prior Art

An OCR (optical character recognition) process or document database production process needs a preliminary process to be performed prior to the relevant character reading (recognition) process. In the preliminary process, the reading order in which the plurality of text regions (image regions each containing characters) of an input document image are to be read is determined.

Two systems (1) and (2) obtaining such a reading order are now described.

(1) Japanese Laid-Open Patent Application No.3-269689 discloses an example of a document reading-in system for facilitating such a reading-order determination operation. The system produces an initial state including point coordinates respectively representing a plurality of regions of an input document image. Then, determination means appropriately replaces the positions of the adjacent point coordinates by one another. Thus, the regions are arranged according to the above reading order. Further, by adding a non-text region such as that consisting of a ruled line to the input document image before the above initial state is obtained, the determining of the reading order is facilitated.

This system depends on the initial state and compares the positions of the adjacent points defining the regions so as to detect the proper reading order. If it is assumed that a region consisting of a title of the document and a region consisting of an ordinary(body) text subsequent to the title are present in the input document image, it is further assumed that the title region and the ordinary(body)-text region are not adjacent but apart or that the positional relationship between the title region and the ordinary(body)-text region does not allow the above determination means to determine the order thereof. In this case, the order relationship between the title region and the ordinary(body)-text region can not be determined. Further, the system handles a non-text region in a manner similarly to that for text regions and does not provide for various states of an input document image in which ruled lines perpendicular to the text-line direction in the image or figures are present.

(2) Japanese Laid-Open Patent Application No. 1-183784 discloses a document image processing system for extracting the columns in an input document image in accordance with a proper reading order. For this purpose, this system produces a tree graph including nodes respectively representing the columns and then detects the logical construction of the columns using the tree graph.

Since this system uses a column arrangement of the input image, some states of the input images may not allow the system to determine columns to which nodes of the tree graphs are to correspond. The states of the input images are those in which no clear columns are found in the input image or an irregular column arrangement such that the upper half consists of two columns while the lower half consists of three columns appears in the input image. Further, this system also does not provide for various states of an input document image in which ruled lines perpendicular to the text line direction in the image or figures are present.

Further, since the above system (1) provides for vertical text-line documents, the reading order is that the right block is first and the left block is second for the adjacent blocks. On the other hand, since the above system (2) provides for horizontal text-line documents, the node order is determined so that the lower region is subsequent to the upper region for two vertically adjacent regions. That is, each system provides for a single one of the respective text-line directions. Further, both the systems do not provide for input document images including text regions, having attributes different from that of the in-order reading regions which are regions to be successively read, such as figures/tables, titles, headers (text regions located at the head of a page and apart from the body part of the page), footers (text regions located at the foot of a page and apart from the body part of the page), or the like.

SUMMARY OF THE INVENTION

A first object of the present invention is to provide a document image processing method and system which detects highly accurately the construction of text regions in an input document image of a vertically typeset or horizontally typeset document so as to determine the precise reading order.

In order to achieve the above first object, a document image processing method comprises:

a) an extracting step extracting text regions from an input document image;

b) a separating (classification) step separating (classifying) said text regions into in-order reading regions to be successively read in the predetermined order and regions having different attributes from the in-order reading regions;

c) a detecting step detecting the construction of said in-order reading regions; and d) a determining step determining the reading order, in which said in-order reading regions are to be read, using said construction.

By enabling separation (classification) of the in-order reading regions from the different-attribute regions, any adverse influences, on reading-order determination operation, due to the different-attribute regions may be avoided. As a result, the reading order of the in-order reading regions can be properly determined.

Said detecting step c) preferably produces said construction in a format that is the same whether said input document image comprises a vertically typeset form or a horizontally typeset form. As a result, a substantially identical process can be used for implementing the reading-order determining, whether the input document image comprises a vertically written or horizontally written document.

Said detecting step c) preferably further includes a tree graph formation step c-1) forming a tree graph representing said construction including nodes respectively representing said in-order reading regions. As a result, the overall in-order-reading-region construction can be determined and thus the reading order can be determined independent of whether paragraph borders clearly appear and independent of the paragraph-border form.

Said separating (classification) step b) preferably separates (classifies) said text regions into in-order reading regions enclosed by a box frame which is included in said input document image and in-order reading regions enclosed by no box frame; and said determining step preferably determines the reading order in which said in-order reading regions enclosed by a box frame are to be read and further determines the reading order in which said in-order reading regions enclosed by no box frame are to be read.

Thus, a document image including such a box frame may be properly processed so that the reading order of the in-order reading regions can be properly determined for both the regions inside the box frame and the regions not contained within the box frame.

A second object of the present invention is to provide a document image processing method and system which automatically re-determines another reading order if it is determined that a previously determined reading-order has problems, the user thus being free from the task of correcting the problematic result.

In order to achieve the above second object of the present invention, the above document image processing method further comprises:

e) a checking step checking whether said reading order is correct or not; and f) a re-determining step again determining the reading order in accordance with another predetermined procedure if a determination of incorrect results from said checking step e).

As a result, a document image having a complicated construction of the in-order reading regions may be properly processed so that the reading order may be precisely determined. Further, the operator's correction steps to be performed on the results due to problematic reading orders may be reduced.

Said checking step e) preferably provides reference points to the respective in-order reading regions;

then connects said reference points in accordance with the relevant reading order; and then determines said reading order to be incorrect if the lines formed as the result of the connection intersect. It is also possible to make the same determination if the number of intersections of the lines formed as a result of the connection exceeds a predetermined threshold value.

This procedure may be applied to the method employing the tree-graph so that the intersection of lines between the tree nodes will be detected.

Said checking step e) preferably checks the reading order, in which the in-order reading regions are to be read, for the in-order reading regions enclosed in each box frame which is included in said input document image; and said re-determining step f) preferably again determines the reading order for said in-order reading regions enclosed in said box frame if the re-determining operation is needed to be performed.

As a result, a problematic situation in which a line connected between in-order regions enclosed in different box frames and a line connected between in-order regions both enclosed in the same box frame intersect can be eliminated. Such a problematic situation creates complication in the checking step e) detecting such intersections. Thus, the checking step e) can perform the checking operation using the simple criterion of the presence of intersections.

A third object of the present invention is to provide a document image processing method and system which obtain document information through a character reading (recognition) operation using a precisely determined reading order.

In order to achieve the above third object of the present invention, the above document image processing method further comprises g) a character recognition step reading the characters constituting said in-order reading regions in accordance with said reading order. As a result, a document image having a complicate in-order-reading-region construction may be precisely read using the thus precisely determined reading order.

Other objects and further features of the present invention will become more apparent from the following detailed description when read in conjunction with the accompanying drawings.

DESCRIPTION OF THE PREFERRED EMBODIMENTS

Figure 1:
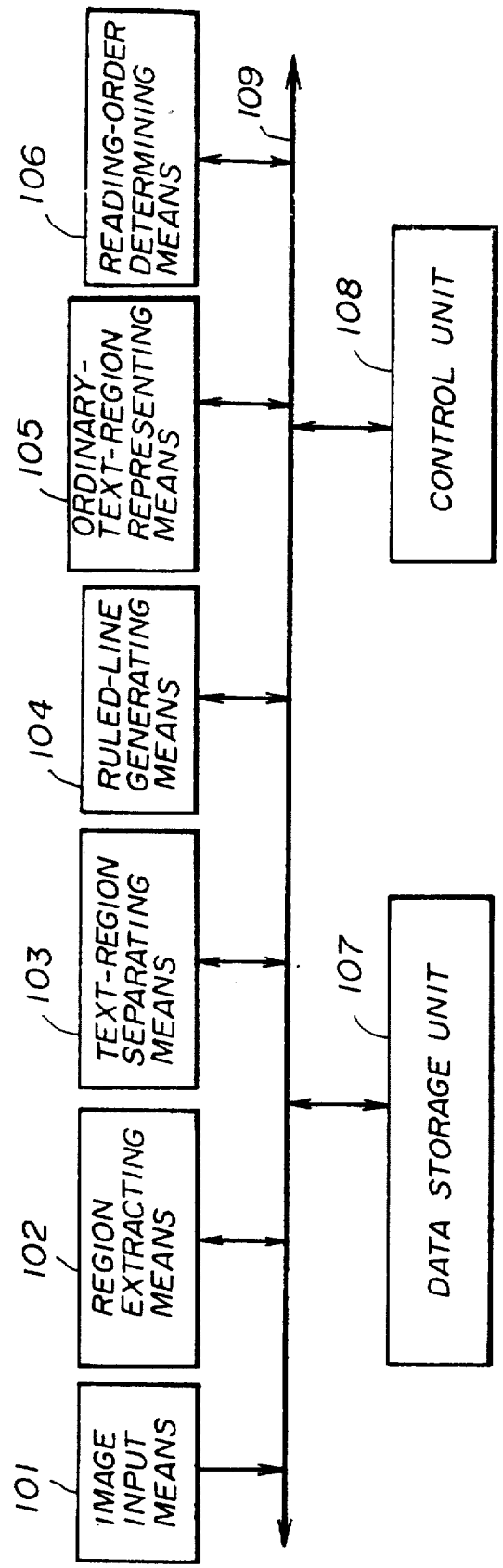
FIG. 1 shows a block diagram of an apparatus in a first embodiment of the present invention.
Figure 2:
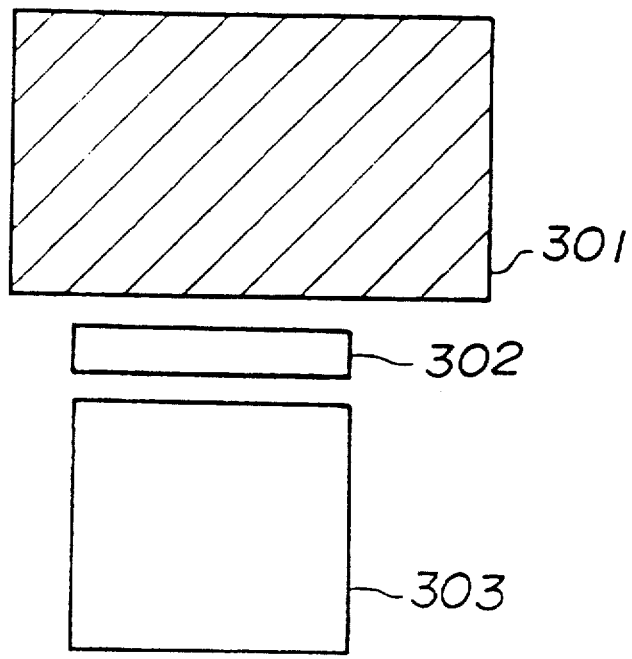
FIG. 2 illustrates separation (classification) of a ordinary (body)-text region, a title region and a figure region.
Figure 3:
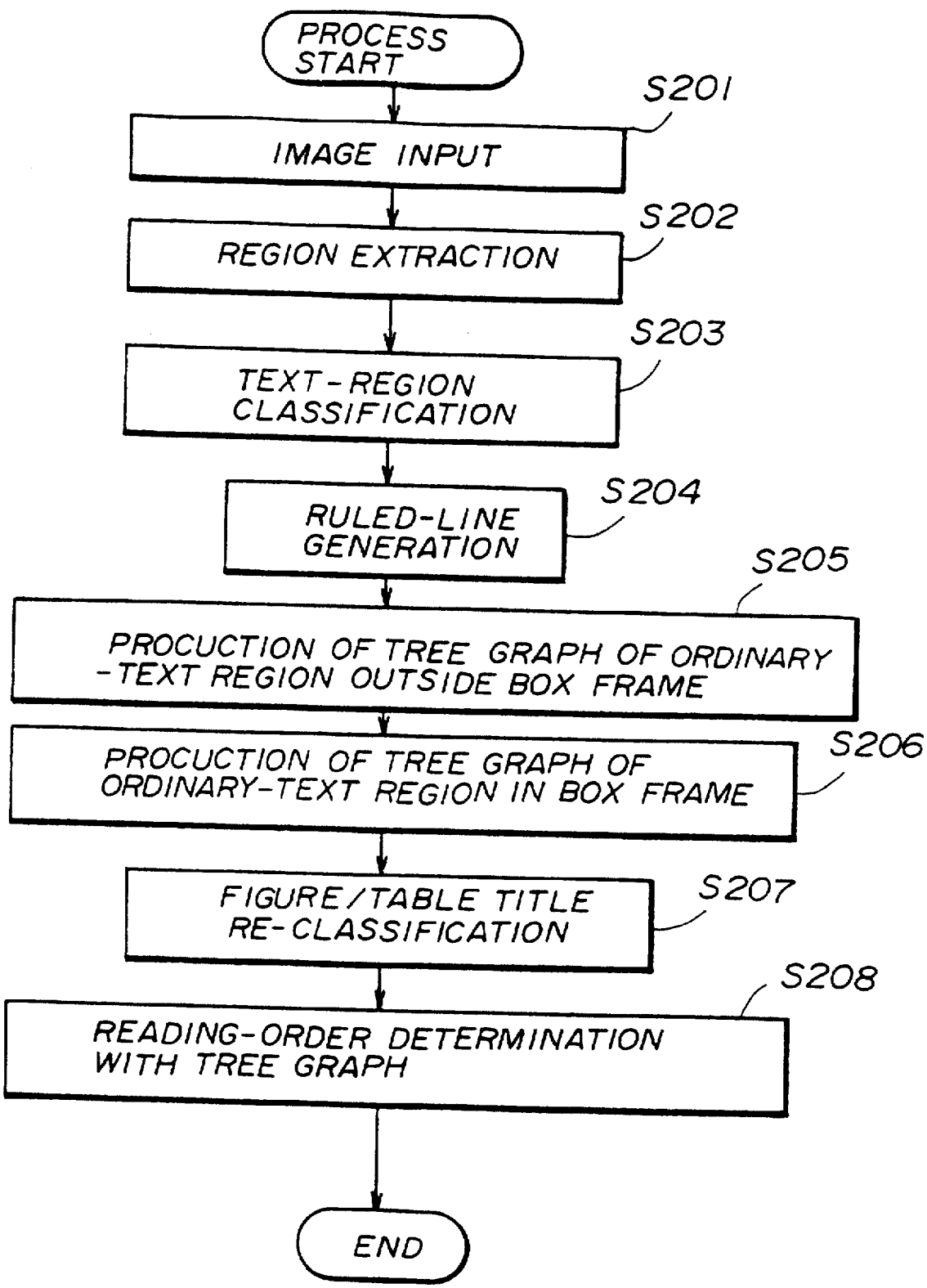
FIG. 3 shows an operation flow of the apparatus shown in FIG. 1.

A document image processing apparatus in a first embodiment of the present invention is now described in general.

The apparatus separates (classifies) text regions extracted from an input document image into ordinary(body)-text regions and regions other than the ordinary(body)-text regions. The term 'ordinary(body)-text regions' refers to regions which are to be successively read in a predetermined order. The term 'regions other than the ordinary(body)-text regions' (or 'special-text regions') refers to regions having attributes different from those of the ordinary(body)-text regions and may comprise a figure title, a table title, header, footer such as mentioned above, or the like.

Then, the apparatus produces a tree graph representing the construction of the ordinary(body)-text regions, where a coordinate system matching the text-line direction is used and the tree includes nodes respectively corresponding to the ordinary(body)-text regions. Further, a scope of influence is defined for each node using a vertical ruled line or the like and the parent-child relationship of the nodes is found according to the thus defined scopes of influence. A tree is produced for the ordinary(body)-text regions inside each box frame and the thus produced trees are coupled to a general tree. The order of the nodes in the thus produced tree is then found so that the reading order (in which the ordinary(body)-text regions are to be successively read) of the ordinary(body)-text regions is determined.

The separation (classification) of the text regions into the ordinary(body)-text regions and the special-text regions enables to remove the special-text regions such as a title block from the resulting tree. The thus produced tree enables determining of the precise reading order of the ordinary (body)-text regions without any adverse influences due to the special-text regions which have the reading order different from that of the ordinary(body)-text regions.

Further, the use of the coordinate system matching the text-line direction enables using the tree in the same manner whether the text-line direction is vertical or horizontal. As a result, vertically written and horizontally written documents can be similarly processed.

Representing of the ordinary(body)-text regions as the nodes of the tree enables detecting of the overall ordinary (body)-text-region construction independent of the column formation present in the input document image. Further, the parent-child relationship findable between the nodes using the above scope of influence of each node enables detecting of the precise ordinary(body)-text-region construction taking account of title blocks and/or figures included in the input document image. (Such detection may not be performed by a simple determining as to whether or not the regions are arranged vertically.) Thus, the reading order of the ordinary(body)-text regions can be precisely determined.

A document image processing apparatus in a second embodiment of the present invention is now described in general. A checking means being provided determines a reading order obtained from a tree graph as described above to be incorrect if lines representing the reading order intersect. A reading-order re-determining means being provided then again determines another reading order by sorting the ordinary(body)-text regions in an order such that the ordinary(body)-text region is to be read earlier the closer location of the contour rectangle thereof is to the top-left of the page (as will be described in the second-embodiment apparatus). (The 'contour rectangle of the ordinary(body)-text region' is a rectangle having sides parallel to the text-line direction and which is the minimum rectangle which can enclose the ordinary(body)-text region.) As a result, the precise reading order of ordinary(body)-text regions can be determined in a document image in which the ordinary(body)-text regions' arrangement is complicated.

A document image processing apparatus in a third embodiment of the present invention then obtains the document information by performing a character recognition operation on the ordinary(body)-text regions in the input document in accordance with the reading order determined in the above apparatus in the first embodiment.

The above document image processing apparatus in the first embodiment of the present invention is now described in detail.

With reference to FIG. 1, an image input means 101 includes a scanner for inputting a document image as a two-tone image. A region extracting means 102 extracts regions such as text regions, figure regions, ruled-line region and so forth. A text-region separation (classification) means 103 separates (classifies) the thus extracted text regions into ordinary(body)-text regions (in-order reading regions) among which the reading order is to be determined and special-text regions such as a figure title, a table title, header, footer and so forth. A ruled-line generating means 104 generates the ruled-line information concerning the ruled-line regions extracted by the means 102 and also generates imaginary ruled lines in a white region and/or the edges of a figure region present in the input document image. A ordinary(body)-text-region representing means 105 produces a tree graph representing the ordinary(body)-text regions (including the ordinary(body)-text regions inside a box frame) so as to detect the ordinary(body)-text-region construction. There may be a possibility that the above ordinary(body)-text regions include a text region other than a ordinary(body)-text region because the above region separation (classification) means 103 may not completely separate (classify) ordinary(body)-text regions. However, such approximate ordinary(body)-text regions may be referred to simply as ordinary(body)-text regions, hereinafter. A reading-order determining means 106 determines the reading order of the ordinary(body)-text regions using the thus produced tree. A control unit 108 controls the above respective means and a data storage unit 107 stores various data of the input document image, the extracted regions, the produced tree graph, and so forth. A data communication bus 109 carries the data between the above respective components.

The respective means 102 through 106 may be implemented with individual hardware units, or may be implemented with individual software units, or may be implemented with software on a common hardware unit.

With reference to FIGS. 2 through 10, an operation flow of the document image processing apparatus in the first embodiment is now described.

In a step S201 (the term 'step' will be omitted, hereinafter), the image input means 101 inputs a document image as a two-tone image. The data representing the thus input document image is stored in the data storage unit 107.

In S202, the region extracting means 102 extracts the text regions, figure regions and so forth from the input document image. The information representing the thus extracted regions is also stored in the data storage unit 107.

In S203, the text-region separating (classification) means 103 classifies the above text regions into ordinary(body)-text regions such as described above and regions such as those of figure titles, table titles, headers, footers and so forth. The ordinary(body)-text regions are to include those enclosed by a box frame and the reading order will be determined so that the ordinary(body)-text regions inside the box frame will be subsequent to the ordinary(body)-text regions enclosed by no box frame. The classification is now described in detail.

If the region extracting process in S202 comprises extracting of only contour rectangles (such as described above) of the respective regions but does not comprise extracting of the contents (image contents) of the regions, there may be a case where the shape of the image is significantly different from the shape of the relevant contour rectangle due to the property of contour-rectangles. Such a significant difference may occur when the image includes a plurality of regions such as text regions and figure regions and the plurality of regions overlap with one another, a single contour rectangle being then extracted for the plurality of regions. The apparatus therefore has to have a function of detecting such overlapping so as to divide the single contour rectangle into a plurality of rectangles respective corresponding to the plurality of regions. Thus, the above significant difference may be eliminated.

First, figure titles and table titles are classified. Normally, each of the figure titles and table titles is one of the text regions having a few text lines and located in proximity to a respective one of the relevant figures and tables. In order to determine whether or not a relevant region among the text regions comprises a figure-title/table-title region, the distance between the relevant region and the nearby figure/table is calculated. If the apparatus has a function of detecting the outline of the figure/table, the distance between the outline and the relevant region is calculated. If the apparatus has a function of determining the contour rectangle such as described above of the figure/table, the distance between the contour rectangle and the relevant region is calculated. Then, the apparatus determines that the relevant region is a candidate figure/table title if the thus calculated distance is sufficiently small and the number of lines constituting the relevant region is sufficiently small.

Subsequently, it is determined whether or not the figure/table title candidate mentioned above is a true figure/table title as will now be described. The geometric relationship between the outline of the figure/table title candidate and the outline of text regions located at the opposite side, to the relevant figure/table region, of the relevant figure/table title candidate, is examined. This examination is described with reference to FIG. 2. A figure region 301, text region 302 which has been determined to be a figure/table title candidate with respect to the figure region 301 and another text region 303 are arranged in the order in an input image. The example geometric arrangement shown in FIG. 2 has the text region 303 located on the opposite side to the figure region 301 with respect to the figure/table title candidate and also the borders of the outlines of the two regions 302 and 303 are aligned at both the left and right sides. As a result, the apparatus determines the two regions 302 and 303 to be a sequence of ordinary(body)-text regions, that is, ordinary (body)-text regions to be read in order, and determines the figure/table title candidate not to be a figure/table title. However, if the outline borders of the two regions 302 and 303 were not aligned at both the left and right sides, that is, if they were aligned at only one side, or were not aligned at any side, the candidate 302 would be determined to be a figure/table title. Alternatively, a method in which the relevant candidate is determined not to be a figure/table title if the outline borders are aligned at only one side may be used.

After a figure/table-title classification process such as described above has been performed, a header classification is performed. Whether ordinary(body)-text regions are vertically written or horizontally written, the header is located at the top of the document page. Normally, even if the ordinary(body)-text regions are vertically written, the header is horizontally written and located at the top. The apparatus may have a function of detecting the text-line direction but may not have a function of detecting the character orientation (that is, a character is normally in the upright orientation but may lie on its side after the document page has been rotated by 90° from the normal orientation). In this case, if the apparatus determines the text-line direction to be horizontal, the relevant document may be one which is vertically written. Such a situation occurs as a result of the document having been input after being rotated by 90°. It can be assumed that a document image is input so that the beginning of the document page with respect to the reading order thereof is located at the top of the input image if the above situation occurs. According to this assumption, the left side of the input image corresponds to the top of the document page.

On the basis of this assumption, the apparatus checks for the presence of a header in the top area and left area of the relevant image if the text-line direction is detected to be horizontal. On the other hand, the apparatus checks for the presence of a header for in top area and right area of the relevant image if the text-line direction is detected to be vertical.

The above presence check is described more concretely. The apparatus detects the presence of a ruled line in an area to be checked. If a ruled line is present there, it is then determined whether the length of the ruled line is sufficiently long with respect to the horizontal length or the vertical length of the entire input image, that is, the length is almost same as, for example, the horizontal length or the vertical length of the input image, and also no large text regions (that is, text regions including several text lines) are present on the outer side of the ruled line. If it is determined, the ruled line is then detected to be a ruled line separating (classifying) the text regions into the ordinary(body)-text region and the header. A small text regions located on the above outer side is determined to be a header.

Figure 4:
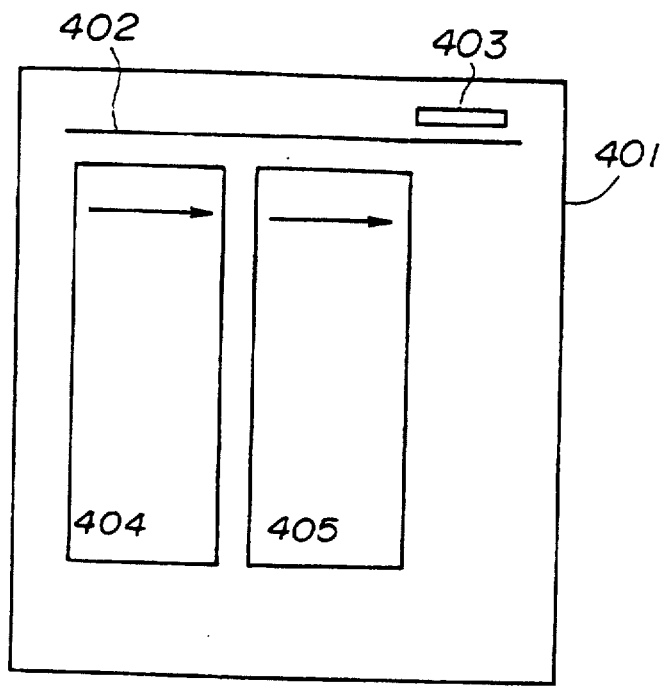
FIG. 4 illustrates separation (classification) of a header from ordinary(body)-text regions.

This detection process is described using a FIG. 4 example. An input image 401 includes a ruled line 402 and text regions 403 through 405. After the apparatus has determined that the text-line direction is horizontal for example, since a header, if it is present, should be present at the top area or left area as described above in this example, the apparatus checks the areas for a sufficiently long ruled line. Since the FIG. 4 example image includes a ruled line 402, then the apparatus checks the upper area defined by the ruled line 402 for a large text region. Since this example includes the text region 403 which is not a large text region including several text lines, the apparatus determines that there is no large text region and thus determines that the ruled line 402 is the ruled line separating (classifying) the relevant regions into the ordinary(body) text and the header. Thus, the small text region 403 in the upper area defined by the ruled line 402 is classified as a header.

If no ruled line is present in an input image, the apparatus generates a horizontal imaginary ruled line and positioned a certain distance down from the top edge of an area defined by a line (forming a rectangle for example) enclosing all the text regions present in the input image, and/or generates a vertical imaginary ruled line and positioned a certain distance in from the left edge of the same area. Then, the imaginary ruled lines are used as real ruled lines for discerning a header on the page in a method similar to the method in which the ruled line 402 is used for the same purpose in the FIG. 4 example.

Figure 5:
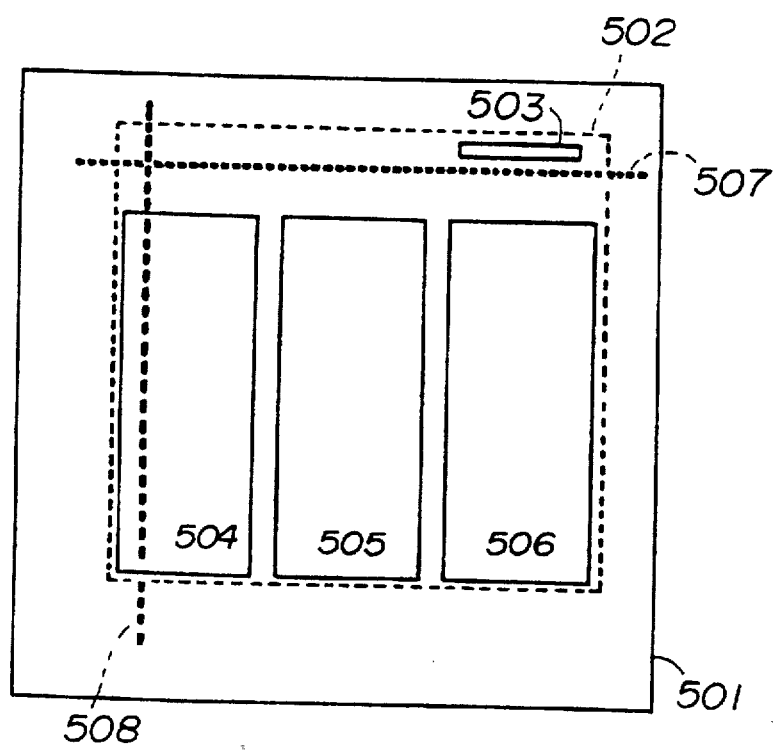
FIG. 5 illustrates imaginary ruled lines to be used for the above header separation (classification)

The method is described using an example illustrated in FIG. 5. The FIG. 5 example input image 501 represents a page including an area 502 defined by a line (forming a rectangle) enclosing all text regions 503 through 506 present in the input image 501. The apparatus generates two imaginary ruled lines 507 and 508 such as those described above at the top and left of the image 501. Since no large text region is present in the upper area defined by the imaginary ruled line 507 in this example, the imaginary ruled line 507 may be used as the ruled line to separate (classify) the text regions into ordinary(body)-text region and header. The apparatus then classifies a small text region 503 located in the upper area as a header. On the other hand, the imaginary ruled line 508 lies over the large text region 504.

In order to prevent failure to detect headers through oversight, the apparatus may have a function of using an imaginary ruled line lying over a text region, such as the line 508, as a ruled line to separate (classify) text regions into a ordinary(body)-text region and a header. On the other hand, in order to prevent such a text region, overlain by an imaginary ruled line, such as the region 504, from being erroneously classified as a header, the apparatus may have a function of invalidating such an imaginary ruled line as the line 508. There may be a situation that a document page is skew on input. In such a situation, the apparatus accordingly generates skew imaginary ruled lines such as those described above so as to match the skew in the input image.

In the case of the text-line direction being vertical, the apparatus checks for a ruled line for separating (classifying) a header from an ordinary(body) text similarly to the above case except for the area to be checked, the position of which area depending on the text-line direction as described above. Then, in the case of no ruled line being present, the apparatus generates imaginary ruled lines. Thus, the apparatus detects headers.

Further, the apparatus detects footers such as those described above similarly to the case where headers are detected as described above. If the apparatus has a function of previously detecting the character orientation such as described above, the apparatus checks a bottom area of the page of an input document image, the bottom area being determined after the document page is ensured to be in its normal orientation using the result of the character-orientation detection. On the other hand, if the apparatus has a function of detecting the text-line direction but does not have a function of detecting the character orientation, the apparatus checks the bottom area and right area of the page if the text-line direction is horizontal and checks the bottom area and left area of the page if the text-line direction is vertical.

As the result of such figure/table title, header and footer classification operations, it is possible to extract ordinary (body)-text regions by removing the thus classified figure/ table titles, headers and footers from the text regions of an input page image. If an input page image includes a box frame, the apparatus classifies text regions as being inside the box frame and as not being enclosed by the box frame so that the apparatus may distinguish between the above two types of text regions.

In S204, the ruled-line generating means 104 generates imaginary ruled lines. However, imaginary ruled lines generated in S204 are different from imaginary ruled lines generated for classifying a header and a footer in S203 with respect to their purposes. Imaginary ruled lines generated in S204 are those generated from a figure and/or a white region as will be described for producing a tree graph representing text-region construction.

The S204 process performed with respect to figure/table regions is described. It is assumed that the apparatus uses a coordinate system matching a horizontal text-line direction. In an example, vertical imaginary ruled lines on the left and right ends of each of a figure and a table are generated. If the apparatus has a function of forming a contour rectangle such as described above for each area in which a figure is present, the apparatus should have performed division of the contour-rectangle into the figure/table title and the true figure region in the figure/table-title classification step even if the contour rectangle encloses them both. Then, the apparatus generates vertical imaginary ruled lines for the divided figure region.

Figure 6A:
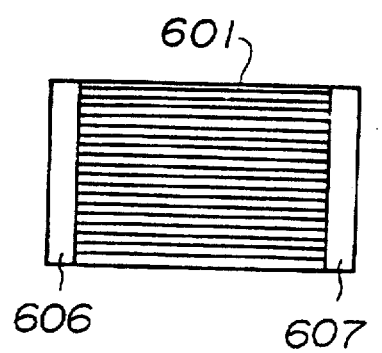
FIGS. 6A and 6B illustrate imaginary ruled line generation for producing a tree graph.
Figure 6B:
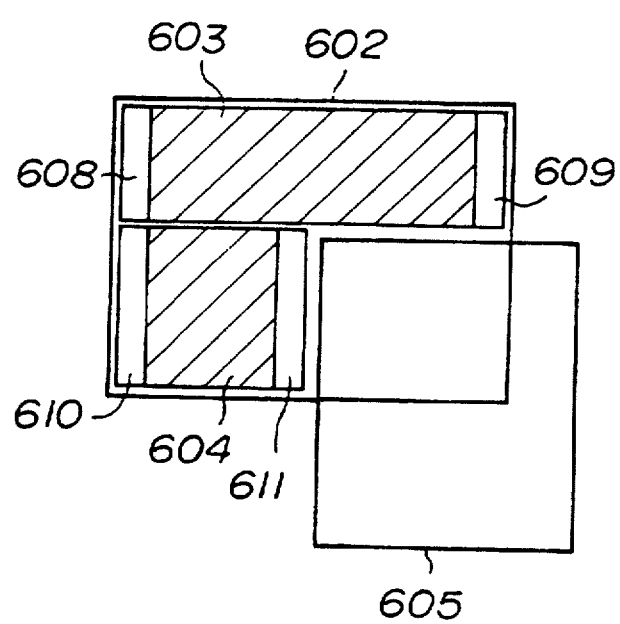

This process is described using example shown in FIGS. 6A and 6B. The apparatus generates two vertical ruled lines 606 and 607 (respectively represented by vertically elongate rectangles) on both-side ends of a table 601 as shown in FIG. 6A. In FIG. 6B, a figure-region contour rectangle 602 overlaps with a text region 605. The apparatus divides the figure-region contour rectangle 602 into two figure regions 603 and 604. Then, the apparatus generates four vertical ruled lines 608 through 611 at side edges of the respective figure regions 603 and 604.

A process of generating an imaginary ruled line from a white region is described. The term 'white region' means a blank area present in an input page image. The imaginary ruled line extends along the text lines in the document of the input page image. Since the text-line direction has been assumed to be horizontal as mentioned above, the imaginary ruled line comprises a vertical ruled line. The apparatus selects a large white region, for which an imaginary ruled line is to be generated, from the white regions present in the input page image. For this purpose, the apparatus measures the horizontal lengths and vertical lengths of the white regions using a projecting technology by which the horizontal length and vertical length are projected on vertical and horizontal axes or using pixel-counting technology by which the white pixels constituting the white regions are coded and the resulting codes are counted along the vertical and horizontal directions while the pixels to be counted are those adjacent to one another. Then, after the large white region is selected, the apparatus generates a horizontal imaginary ruled line at the center portion of the selected white region.

(With regard to the above projecting technology, see 1993 IEEE article Block Segmentation and Text Area Examination of Vertical/Horizontal Written Document, written by Naohiro Amamoto, Shin Torigoe, and Yoshitaka Hirogaki, pages 739–742.)

Further, a horizontal imaginary ruled line having a length equal to the horizontal length of the page image is generated in the top portion of the coordinate system. (In the case where the text-line direction is vertical, a vertical imaginary ruled line having a length equal to the vertical length of the page image is generated in the left side portion of the coordinate system since a coordinate system used there is that obtained as a result of rotating the coordinate system used in the horizontal text-line direction case by 90°.)

Further, the top line of the four lines constituting the box frame will be used as a horizontal ruled line and the both-side lines thereof will be used as vertical ruled lines.

S205 and S206 for producing a tree graph are now described. Each of S205 and S206 uses only ordinary(body)- text regions extracted as a result of the region classification operation in S203 such as described above. In the description of S205 and S206 hereinafter, a region referred to as a 'text region' is a ordinary(body)-text region. However, there may be a possibility that a region which is not a ordinary (body)-text region is erroneously extracted as a ordinary (body)-text region.

In S205, the ordinary(body)-text-region representing means 105 produces a construction tree graph for ordinary (body)-text regions enclosed by no box frame. The tree graph is produced by providing nodes and then successively determining the parent of each node.

Nodes are respectively created for ordinary(body)-text regions enclosed by no box frame and horizontal ruled lines (including imaginary ruled lines). Then, the apparatus processes the nodes successively so that a node located at a higher position on the page is processed earlier.

A node processed subsequent to a relevant node is a candidate child of the relevant node. The apparatus determines whether the child candidate is a true child node and links the relevant node and the true child node so as to indicate the parent-child relationship if the candidate has been determined to be a true child node. If the child node has already been linked as a child to another node before the above linking operation is performed, the apparatus then determines as to which node of the nodes both linked to the child node is the proper parent node. Then, the apparatus performed a linking/unlinking operation so that the child node is linked only with the node which has been thus determined to be the proper parent node, so as to indicate the parent-child relationship. If the apparatus cannot determine which node of the two nodes is the proper parent node due to lack of information, the apparatus performs a linking/ unlinking operation so that the child node is directly linked only with the root of the relevant tree. The above relevant node should have already been a child candidate of a node which was processed prior to the processing of the relevant node. If the relevant node has not yet been linked as a child to any node although the processing of the preceding node has been already completed, the apparatus determines that the relevant node is a direct child of the root. Further, the apparatus determines that the horizontal ruled line consisting of the top side of the box frame is a direct child of the tree root.

Figure 7:
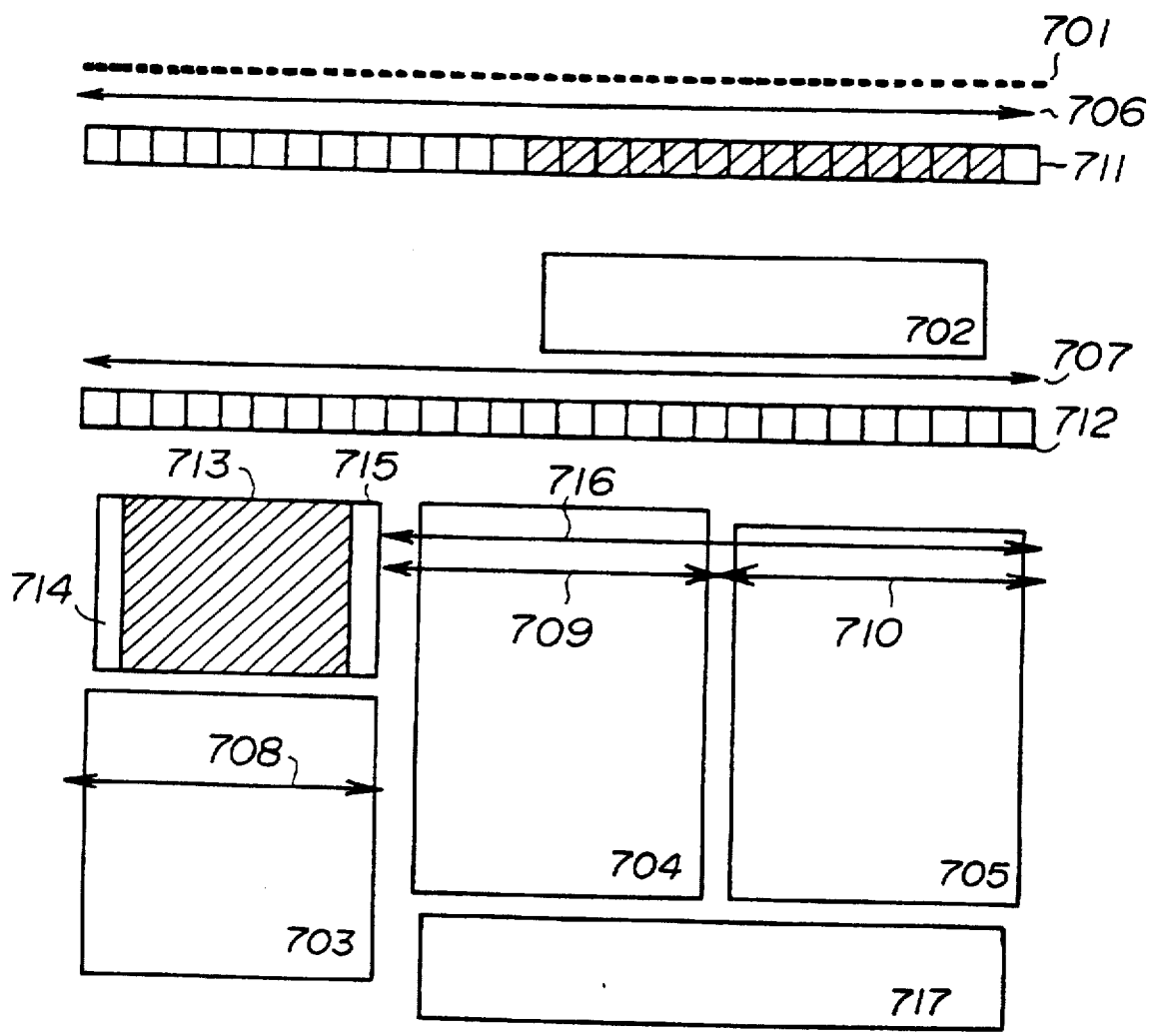
FIG. 7 illustrates detection of the construction of ordinary (body)-text regions not contained within a box frame

The tree producing process is described more concretely using an example shown in FIG. 7. A page image shown in FIG. 7 includes text regions 702 through 705, a figure region 713 and a text region 717. FIG. 7 also shows an imaginary ruled line 701 generated at the top of the coordinate system, scopes of influence 706 through 710 (will be described) of respective nodes, searching scopes 711 and 712 for the respective imaginary ruled line 701 and text region 702, vertical imaginary ruled lines 714 and 715 and a temporary scope of influence 716 of the text region 704. Hereinafter, the reference numerals indicating the regions will also be used to indicate corresponding nodes.

Firstly, the top imaginary ruled line 701 is selected as a node 701 to be processed now (the node being processed may be referred to as a processing node, hereinafter) and, since its parent node has not been determined, the node 701 is assumed to be a child of the root of the tree. Each node has its scope of influence and searching scope. Each node inherits its parent's scope of influence as its scope of influence and its searching scope is initially equal to its scope of influence and may become smaller successively as a result of being updated as will be described.

Since the processing node 701 is a child of the root, the node 701 has a scope of influence 706 having a length identical to the length of the node 701. The node 701 has a searching scope 711 having a length identical to that of the scope of influence 706 and the searching scope 711 is used to search for subsequent nodes.

The apparatus can then firstly find a text region 702 as the node 701's subsequent node as a result of searching the area in the page image shown in FIG. 7 having the length of the searching scope 711 (a first step). Then, the apparatus determines that the found region 702 is a child node candidate 702 of the node 701 (a second step). Then, the apparatus removes a portion from the searching scope 711 (a third step), which portion of the scope 711 (indicated by the hatching shown in FIG. 7) corresponds to the length of the child node candidate 702 since the area corresponding to the portion has been already searched. Thus the searching scope 711 has been updated. Since the node 702 is the child candidate of the node 701, the node 702 has its scope of influence 707 having the same length as that of the scope of influence 706 as a result of inheriting the length thereof.

The apparatus then searches the area defined by the length of the remaining scope (portions not provided with hatching) of the scope 711 and then can find the text region 704 as a node 704 as another child candidate of the node 701 (the first step). The area occupied by the node 704 is, as shown in FIG. 7, such that the node 704 may be a child of the node 702 since the scope of influence 707 (the area in the page image shown in FIG. 7 having the length of the scope 707) of the node 702 overlaps with the region of the node 704. As a result, the apparatus does not link (so as to establish a parent-child relationship) the node 701 to the node 704 (the second step but no linking has been performed there and thus the third step is not performed). Further, the region 703 acting as a node 703 will also be found as a result of searching the area defined by the remaining searching scope of the scope 711 (the first step). The node 703 may also be a child of the node 702 since the scope of influence 706 of the node 702 overlaps with the region of the node 703. Thus, the apparatus does not link the node 703 to the node 701 (the second step, and the third step is not performed). The apparatus may then find the region 705 as a node 705 since the remaining searching scope of the scope 711 of the node 701 slightly overlaps with the region 705. However, the apparatus has a function of determining a region as to be a found region only if the searching scope of a relevant node overlaps with the region by a minimum predetermined continuous length. In the FIG. 7 case, since the remaining searching scope of the scope 711 of the node 701 does not overlap with the region 705 by a length equal to or more than the predetermined length, the region is not determined to be a found region.

Then, the node 702 is made the current processing node. The node 704 becomes a child of the node 702. There, each scope of influence is defined so that the scope of influence cannot extend over a vertical ruled line (including an imaginary vertical ruled line). Thus, the scope of influence 716 of the node 704 stops its extension at the vertical ruled line 715 although the scope 715, as a result of inheritance of the scope 707 of the node 704's parent 702 should have extended similarly to the scope 707. Subsequently, the node 705 is checked as a candidate child of the node 702 since the node 705 is included in the searching scope 712 of the node 702. The node 705 is determined, according to the positional relationship between the nodes 704 and 705, not to be in the parent-child relationship with the node 704. This is because both the regions 704 and 705 are located immediately below the region 702 and thus the relevant nodes 704 and 705 are children of the nodes 702. As a result, the node 705 becomes a child of the node 702. If one parent node has a plurality of child nodes, the scope of influence of the parent node to be inherited by the child nodes is then appropriately shared out among the plurality of child nodes. In the FIG. 7 example, the above scope of influence 716 is divided into scopes of influence 709 and 710 respectively for the nodes 704 and 705 as a result of dividing the scope 716 at the middle points of the space between the regions 704 and 705. Subsequently, the region 703 as a node 703 is a child of the node 702 since the node 703 is included in the searching scope of 717 of the node 702 and inherits a part of the scope of influence 707 of the parent node 702 as the node 703's scope of influence 708. The scope of influence 708 has been determined as a result of the scope division between those of the adjacent nodes 703 and 704 at the middle point of the space between the regions 703 and 704. (As mentioned above, the scope of influence is defined by the ruled line 715. Thus, if the above middle point were located left side beyond the ruled line 715, the division point should have been determined to be on the ruled line 715.) There, the searching scope 712 has been renewed so as to be reduced in its length similarly to the searching scope 711 was reduced in its length as described above with reference to the hatched part therein.

There may be a case, not the FIG. 7 case, where the length of a region of a node is larger than the scope of influence of the node's parent node. In such a case, the scope of influence of the child node is elongated from the scope length inherited from the parent node's scope of influence. The elongating length corresponds to the length by which the region of the child node exceeds the parent's scope of influence. There may be another case where a box frame is present in the page image. In this case, the top edge (ruled line) of the box frame acts as a node as mentioned above and the scope of influence of the node has its length identical to the node itself, that is, the edge (ruled line) in this case, instead of the length inherited from its parent node.

Then, the node 704 is made the processing node. Since the searching scope identical to the scope of influence 709 includes the region 717 as a node 717, the node 717 is a child of the node 704. Since no other region is present below the node 704 in the searching scope 709, the node 705 is then made the processing node.

The same region (node) 717 is also present in the searching scope, identical to the scope of influence 710, of the node 705 and is the child of the node 704 as mentioned above. As a result, the apparatus selects which node of the nodes 704 and 705 is the true parent of the node 717. However, both the nodes 704 and 705 have similar lengths and also almost all of each scope 709 and 710 is occupied by the respective portion of the region of node 717. Thus, the apparatus cannot determine which is the true parent and thus cancels the appointment of the node 717 as the child of the node 704. Then, the apparatus appoints the node 717 as a child of the root of the tree.

If a parent node has a plurality of child nodes such as the nodes 703, 704 and 705 of the parent node 702, the plurality of nodes are arranged in the tree in the following order: If the plurality of nodes are children of a node which is not the tree root, the child nodes are arranged in the same manner as the corresponding regions are arranged in the page image. In the FIG. 7 example, the nodes 703, 704 and 705 are arranged in the tree graph so that the node 703 is located at the left position, the node 704 is located at the middle position and the node 705 is located at the right position. On the other hand, if the plurality of nodes are children of the tree root, the child nodes are temporarily arranged in the tree graph so that nodes connected to the root earliest in the process are at the leftmost positions. The apparatus finally sorts the child nodes of the root as will be described so that the arrangement is finally determined.

A title-region determination process performed in tree-graph production operation such as described above is now described using FIGS. 7 and 8. The title-region determination process is performed together with performance of the node-linking operation such as that described with reference to FIG. 7. The apparatus puts a title flag on each node indicating whether or not the node is a title region. The top-position node such as the node 701 in the FIG. 7 example has its title flag in the ON state indicating that the relevant node is a title region. Then, with regard to the subsequent node, the node 702 in this example, which is normally the child of the top-position node, the apparatus examines whether or not any text regions are present at the left side and/or right side of the relevant subsequent node. If no text region is present, the title flag of the node is also turned ON. However, if the relevant node is not the only child of the top-position node, the thus turned-ON title flag is then turned OFF. That is, if any child node had been connected to the top-position node such as the node 701 other than the relevant subsequent node such as the node 702, the title flag of the node 702 should be OFF indicating that the relevant node not being a title region.

Figure 8:
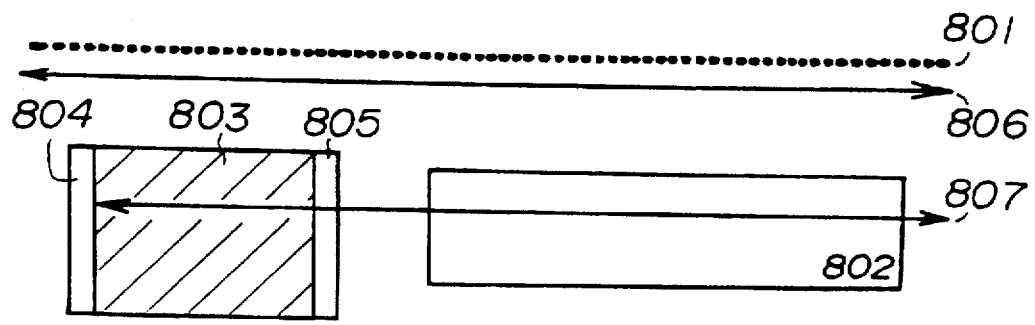
FIG. 8 illustrates relationships between imaginary ruled lines and the relevant scopes of influence.

If a node has a title flag in the ON state, the apparatus elongates the scope of influence of the node leftward beyond a vertical imaginary ruled line if the left side of the scope of influence has been defined by the vertical imaginary ruled line, the extending beyond the imaginary ruled line being permitted only once. In the FIG. 8 example, FIG. 8 showing the top area of an input page image, the left side of the scope of influence 807 of a text region 802 is elongated beyond an imaginary vertical ruled line 805 and then defined by an imaginary vertical ruled line 804 as shown in FIG. 8. On the other hand, the scope of influence 707 of the text region 702 has the same length as the scope 706 of the top-position node 701 since no ruled line is present to define the left side of the scope of influence 707. The page image of the FIG. 8 example includes a top-position horizontal imaginary ruled line 801 having the scope of influence 806, similar to top-position horizontal imaginary ruled line 701 and its scope of influence 706 in FIG. 7. The FIG. 8 page image also includes a figure region 803, vertical imaginary ruled lines 804 and 805 provided at both sides of the figure region 803 similar to the figure region 713 and its vertical imaginary ruled lines 714 and 715 in FIG. 7. As described above, the scope of influence 807 of the text region 802 should have been defined by the imaginary vertical ruled line 805 if the node 805 had an OFF title flag. An influence-scope elongating operation such as that described above results in that a node determined to be a title region may have a scope of influence elongated and may thus have more children included in the thus elongated scope of influence in the tree graph.

In the FIG. 7 example, then, the apparatus examines whether or not each node of the children of the node 702 is a title region. In the above described node linking operation, the node 704 is then found as the first child of the node 702 as described above. The node 704 has the nodes 703 and 705 located on either side thereof as shown in FIG. 7. Accordingly it can be determined that the node 704 and the nodes retrieved subsequently to the node 704 are not title regions. Thus, the title flag of node 702 is turned OFF. The apparatus does not perform the title-region determination processing on nodes if the parent node of the relevant nodes has an OFF title flag. Thus, meaningless title-region determination processing can be eliminated by using such title flags.

The apparatus performs operations such as those described above on all text regions, other than those enclosed by any box frames, successively through the input page image from the top to the bottom thereof.

In S206, the ordinary(body)-text-region representing means 105 then produces a tree graph representing text regions enclosed in a box frame.

Similarly to S207 described above for text regions not enclosed by any box frames, the apparatus links a processing node to a node, as a child of the processing node, which node is included in the scope of influence of the processing node. As described above, the apparatus has previously produced a tree including nodes respectively representing text regions not enclosed in any box frames. The thus produced tree also includes a node which represents the top-position horizontal ruled line (top edge) of each of box frame. Such top-position horizontal ruled lines may be used to produce tree portions for text regions enclosed in respective box frames.

Figure 9A:
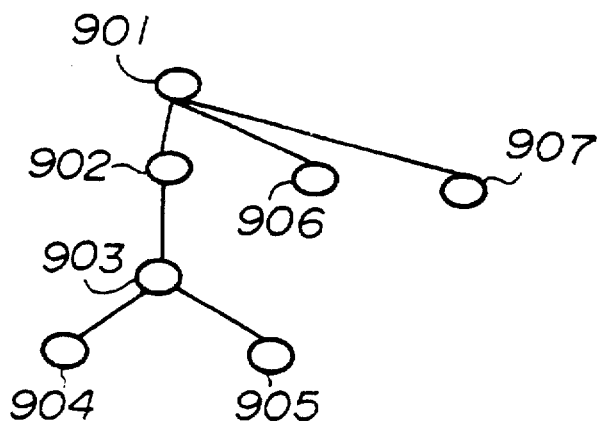
FIG. 9A shows the tree graph of text regions not contained within a box frame.
Figure 9B:
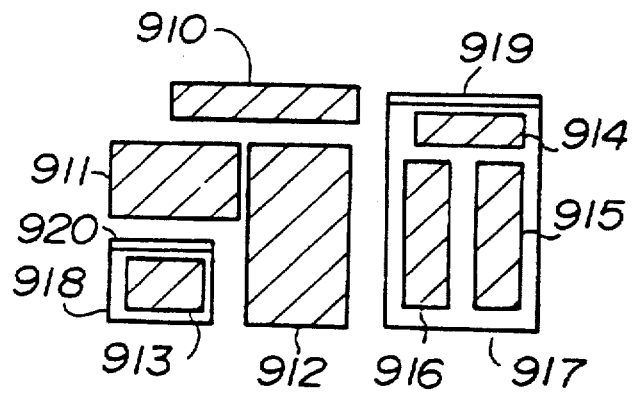
FIG. 9B illustrates tree-graph production of text regions.

A method for producing a tree graph including tree portions corresponding to text regions enclosed in a box frame is described using FIGS. 9A and 9B. As shown in FIG. 9B, the page image in this example includes text regions 910 through 916 and a box frame 917 enclosing the text regions 914, 915 and 916 and a box frame 918 enclosing the text region 913. As shown in FIG. 9A, a tree graph which has been produced in S205 includes a root 901; a node 902 corresponds to the top-position imaginary ruled line such as the previously-discussed 701 or 801; a node 903 corresponds to the text region 910; a node 904 corresponds to the text region 911; the node 905 corresponds to the text region 912; a node 906 corresponds to the top horizontal ruled line 920 of the box frame 918; and a node 907 corresponds to the top horizontal ruled line 919 of the box frame 917.

The top horizontal ruled lines 919 and 920 of the box frames 917 and 918 respectively are handled in S205 in the same ways as the above-mentioned top-position imaginary ruled lines 701 and 801 and as the above line 902 in S205. However, although the title flag of the top-position node is assumed to be ON for text regions enclosed by no box frame as mentioned above, no title-region determination processing is made to be performed on text regions enclosed in box frames. For this purpose, the title flags of the nodes 906 and 907 are always made to be in their OFF states.

Since the FIG. 9B example page image has the text region 913 below the horizontal ruled line 920 corresponding to the node 906, the text-region 913 node is linked, as a child of the node 906, to the node 906. Since the text region 914 is located below the horizontal ruled line 919 corresponding to the node 907, the text-region 914 node is linked, as a child of the node 907, to the node 907. Since the text regions 915 and 916 are located below the region 914, the region 915 node and region 916 node are linked, as children of the region 914 node, to the region 914 node. Such operations performed in S206 include child-node candidate retrieval operations using scopes of influence and searching scopes and child-node candidate determination operations as to whether or not the retrieved child-node candidates are true child nodes, similar to those performed in S205. There, nodes, corresponding to the top horizontal ruled lines of respective box frames, such as the nodes 906 and 907 directly linked to the root 901 have scopes of influence having lengths respectively equal to the horizontal ruled lines' lengths such as the lengths of the ruled lines 919 and 920.

After the tree graph has been thus produced, the apparatus sorts the child nodes of the root. The child nodes include the top-position imaginary horizontal ruled line, regions for which no proper parent could not be determined from among a plurality of parent candidates, and the top horizontal ruled lines of box frames. In the sorting, the child nodes (of the root) corresponding to the top horizontal ruled lines of box frames are given positions further to the right than the other types of child nodes (of the root) in the tree graph. Further, among the child nodes of the ruled lines of the box frames, a child node is located at a position further to the left in the tree graph as the box-frame ruled line of the child node is located closer to the top left of the input page image. Which region is located at the higher position on the input page image may be determined using the scopes of influence of the respective nodes for searching for other regions located below the relevant region.

Then, in S207, the ordinary(body)-text-region representing means 105 again performs figure/table title separating (classifying) operation. The means 105 examines each terminal node (which is a node having no child node and corresponds to a leaf of the tree) of the tree produced in S205 and S206 to determine whether the terminal node does not correspond to a ruled line, and also corresponds to a region having a few text lines (the threshold value for which may be identical to that used for the figure/table title separating (classifying) operation performed in S203), and also has a large figure with a predetermined size between the region of the relevant terminal node and the region of its parent node. If the above three conditions are fulfilled, the means 105 determines that the relevant terminal node corresponds to a figure/table title and removes the terminal node from the tree.

Figure 10:
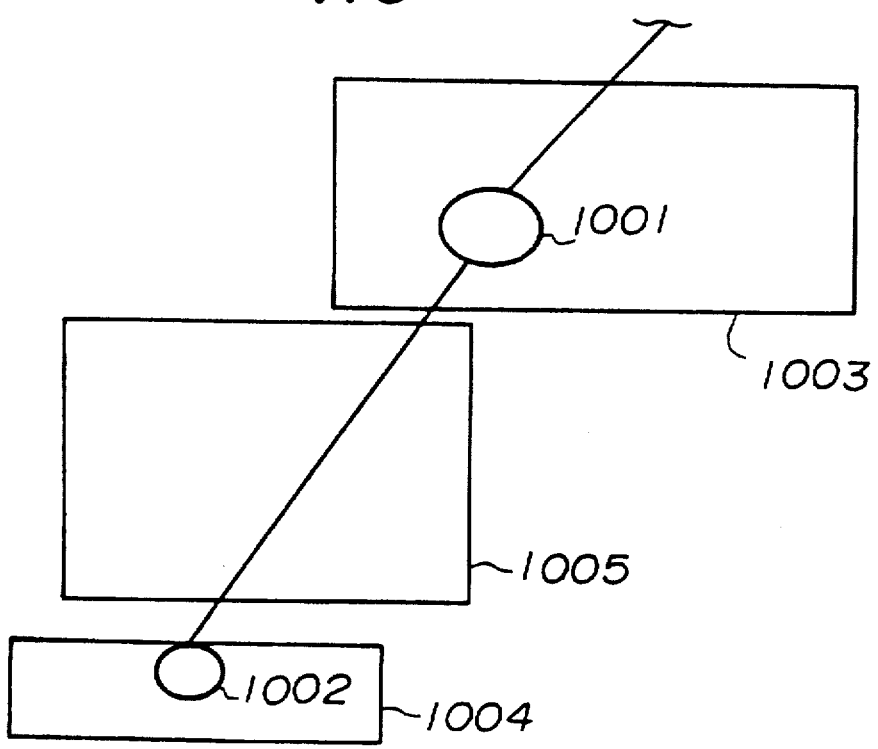
FIG. 10 illustrates re-separation (reclassification) of a figure region and a text region.

Such a figure/table title separating (classifying) operation is described using FIG. 10. In the FIG. 10 example, a partial area of an input page image includes two text regions 1003 and 1004, and a figure region 1005, nodes 1001 and 1002 respectively representing the text regions 1003 and 1004. The node 1002 corresponds to an terminal node (leaf of the relevant tree) and also the region 1004 of the node 1002 has a few text lines. Further, the relatively large figure region 1005 is present between the region 1003 of the node 1001, the parent of the node 1002 and the region 1004 of the node 1002. Thus, the above three conditions have been fulfilled and the node 1002 is removed from the relevant tree.

Then, in S208, the reading-order determining means 106 uses the tree graph produced in S205 and S206 as described above and thus searches for the proper reading order of the text regions which are respectively represented by the nodes other than the nodes corresponding to the tree root and ruled lines including imaginary ruled lines in the tree and should comprise ordinary(body)-text regions as described above.

The above reading-order searching operation may be performed in a preorder searching method. In the method, the starting point is the root of the tree. Then, the descendants (forming a rooted tree having the below-mentioned left-most child as the root) of the left-most child are traced in preorder. Then, the descendants of the child to the right of the left-most child are traced in preorder. The process is repeated until the descendants of the right-most child are traced in preorder. In the descendant tracing operation, the descendants are traced downward by selecting the left-most child of each multi-child branch met in the tracing process until a leaf node is reached, that is, until the tracing arrives at the deepest level in the left-most path. Then, the tracing operation retreats through the thus traced path upward by tracing the children subsequent to the left-most children for each multi-child branch met in the retreating process. Thus, in the tracing operation, paths more to the left take priority and deeper nodes take priority in each path. For details, see the Japanese book *Information Processing Handbook* first published on May 1989, edited by the Information Processing Society, published by Ohm, page 26, FIG.1.9 Tree Tracing method, (a) Preorder.)

The above tree-graph production operation performed in the document image processing apparatus in the first embodiment of the present invention is now summarized. A tree graph representing the positional relationship among the text regions (mostly ordinary(body)-text regions) is produced and includes nodes respectively representing the text regions. Each node has a scope of influence according to which a child of the node is searched for. Scopes of influence are those which are effective to be used in determination of inter-node logical relationship. Then, the child of the relevant node inherits the scope of influence of the relevant node. Thus, child nodes of each node are successively determined so that the tree is produced. Using an such influence-scope concept to control the child-node determination operation enables achieving proper ordinary(body)-text-region construction representation by a tree graph so that figure/table titles and/or figures may be suitably handled as described above in the tree production process. As a result, using the thus produced tree graph enables determining the proper ordinary(body)-text-region reading order.

The tree produced in the tree-production process includes nodes corresponding to regions other than text regions. An example of a node of a region other than text a region used in the tree is a node corresponding to a ruled line extending in a direction parallel to the text-line direction. Further, a node corresponding to a white region, such as that described above, having a length in the text-line direction longer than a predetermined value is used in the tree. Thus, the document image processing apparatus in the first embodiment of the present invention properly handles various types of regions other than text regions such as ruled lines in the text-line direction or in the direction perpendicular thereto, white regions, figure/table regions. Thus, the apparatus properly produces the tree graph representing the ordinary (body)-text-region construction with respect to the proper ordinary(body)-text-region reading order. That is, even if the ordinary(body)-text-region arrangement present in an input page image is produced as a result of inserting various types of regions other than text regions such as those mentioned above thereinto, the apparatus takes the effects on the ordinary(body)-text-region arrangement due to the above various types of regions other than text regions into account by methods including that of using the nodes corresponding to regions of the above various types of regions in the tree.

The apparatus defines the scope of influence of a node by a ruled line in a direction perpendicular to the text-line direction. Further, the apparatus generates imaginary ruled lines in a direction perpendicular to the text-line direction at the two sides (perpendicular to the text-line direction) of a figure/table region. Such imaginary ruled lines also define the scope of influence of a node. Further, the apparatus makes different a manner in which an imaginary ruled line defines the scope of influence of the node corresponding to a title region from that in which an imaginary ruled line defines the scope of influence of the node corresponding to a region other than a title region.

Thus, the document image processing apparatus in the first embodiment of the present invention properly handles ruled lines perpendicular to the text-line direction so that the apparatus properly produces the tree graph representing the ordinary(body)-text-region construction with respect to the proper ordinary(body)-text-region reading order. That is, even if the ordinary(body)-text-region arrangement present in an input page image is produced as a result of inserting ruled lines perpendicular to the text-line direction, the apparatus takes the effects on the ordinary(body)-text-region arrangement due to the above ruled lines perpendicular to the text-line direction into account by controlling the scopes of influence of nodes depending on the presence of ruled lines. Further, by making the defining manner due to such ruled lines different between for a title region and for the other regions, the apparatus properly links child nodes to the node of the title region depending on the property of the title region, the property being that as to how the geometric position of a title region in an input image results in the logical position of the title region in the proper reading order of the entirety of ordinary(body)-text regions including the title region.

Further, the apparatus searches the produced tree for nodes corresponding to figure/table titles which could not be classified in the text region classification process. The text region classification process removes the regions other than ordinary(body)-text regions from the text regions so that only the ordinary(body)-text regions may be used to produce the tree graph. This searching is performed using information concerning the tree-graph node positions and figure/table-region positions. The resulting tree graph is used to determine the proper ordinary(body)-text-region reading order. Such additional classification process further removing a region other than ordinary(body)-text regions from the text regions enables achieving highly accurate ordinary (body)-text region extraction, thus more accurate ordinary (body)-text-region tree representation and more accurate ordinary(body)-text-region reading order determination being achieved.

The above mentioned document image processing apparatus in the second embodiment of the present invention is now described in detail. This apparatus has a function of checking a reading order which has been determined using a tree graph such as that produced by the above document image processing apparatus in the first embodiment of the present invention. This checking operation may prevent problems which may occur as a result of a tree-graph representation operation such as described above being performed erroneously. Such erroneous tree-graph representation performance may occur due to a problem which may be included in the tree-graph representation process or due to a problem which may be included in the input document image. The input document image including such a problem may comprise one representing a document which has a column/figure arrangement having characteristics which provide difficulties in such a tree-graph representation of the column arrangement. In such a problematic situation, since the tree-graph produced in the tree-graph representation process may have errors, the reading order determined using the tree-graph may have errors accordingly. Such resulting errors may comprise ones by which the obtained reading order may be one entirely different from the proper reading order even though the errors included in the relevant tree graph are only in a part of the tree.

Figure 11:
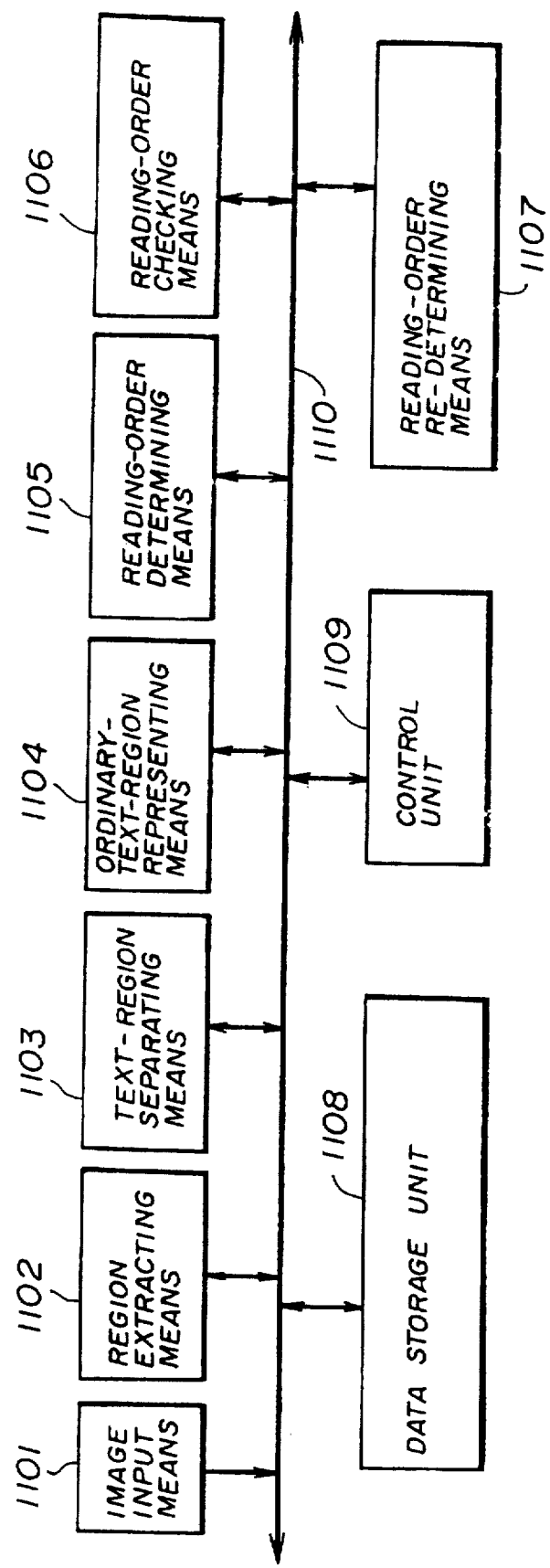
FIG. 11 shows a block diagram of an apparatus in a second embodiment of the present invention.

With reference to the block diagram in FIG. 11, the apparatus in the second embodiment is described. An image input means 1101 comprising a scanner or the like inputs an input document page image. A region extracting means 1102 extracts various regions, from the input document page image, such as text regions, figure regions, ruled-line regions and so forth. A text-region separation (classification) means 1103 separates (classifies) the thus extracted text regions into ordinary(body)-text regions such as described above and special-text regions such as figure title, table title, header, footer and so forth. A text-region construction representing means 1104 produces a tree graph representing the ordinary(body)-text regions so as to detect the ordinary (body)-text-region construction. (However, as described above, there may be a possibility that the above ordinary (body)-text regions include a text region other than a ordinary(body)-text region because the above region separation (classification) means 1103 may not completely separate (classify) ordinary(body)-text regions. Nevertheless, such approximate ordinary(body)-text regions may be referred to simply ordinary(body)-text regions, hereinafter.) A reading-order determining means 1105 determines the reading order between the ordinary(body)-text regions using the thus produced tree. A reading-order checking means 1106 checks as to whether the reading order determined by the reading-order determining means 1105 is correct and a reading-order re-determining means 1107 again determines a reading order of the text regions (ordinary(body)-text regions) included in the same input document image using a different method. A control unit 1109 controls the above respective means and a data storage unit 1108 stores various data of the input document image, the extracted regions, the produced tree graph, and so forth. A data communication bus 1110 carries the data between the above respective components.

The blocks 1101, 1102, 1103, 1104, 1105, 1108, 1109 and 1110 may be identical to the respective same-name blocks 101, 102, 103, 105, 106, 107, 108, and 109 shown in FIG. 1.

Figure 12:
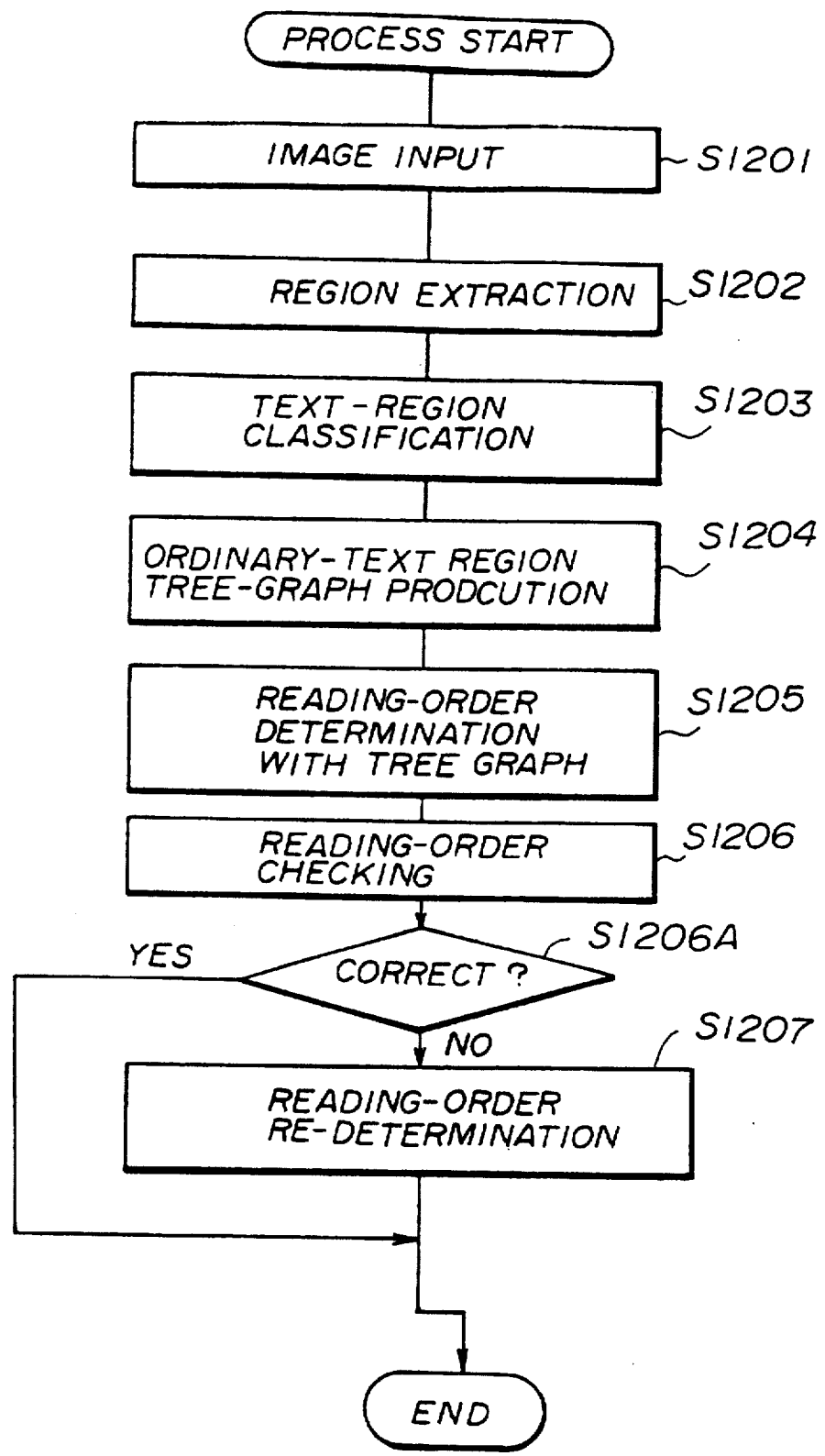
FIG. 12 shows an operation flow of the apparatus shown in FIG. 11.

With reference to FIG. 12, operation flow in the FIG. 11 apparatus is described. S1201 inputs an input document page image as a two-tone image by the image input means 1101. S1202 extracts text regions, figure regions and so forth from the obtained two-tone image. Japanese Laid-Open Patent Application No. 5-81475discloses a text-region extracting method which may be used in S1202 for example.

The text-region separating (classifying) means 1103 classifies the extracted text regions into two types of regions, that is, ordinary(body)-text regions such as described above and another type of region such as those of figure titles, table titles, header, and footer, in S1203. Such ordinary(body)-text regions are handled in the apparatus as will be described so that ordinary(body)-text regions enclosed in a box frame are subsequent to those enclosed in no box frame in the reading order.

The ordinary(body)-text-region representing means 1104 produces a tree graph representing the ordinary(body)-text-region construction in S1204. The reading-order determining means 1105 determines the proper reading order of the ordinary(body)-text regions by performing a predetermined order search operation on the tree-graph represented ordinary(body)-text regions in S1205. The above steps S1203 through S1205 may comprise the steps S203 through S208.

Figure 13:
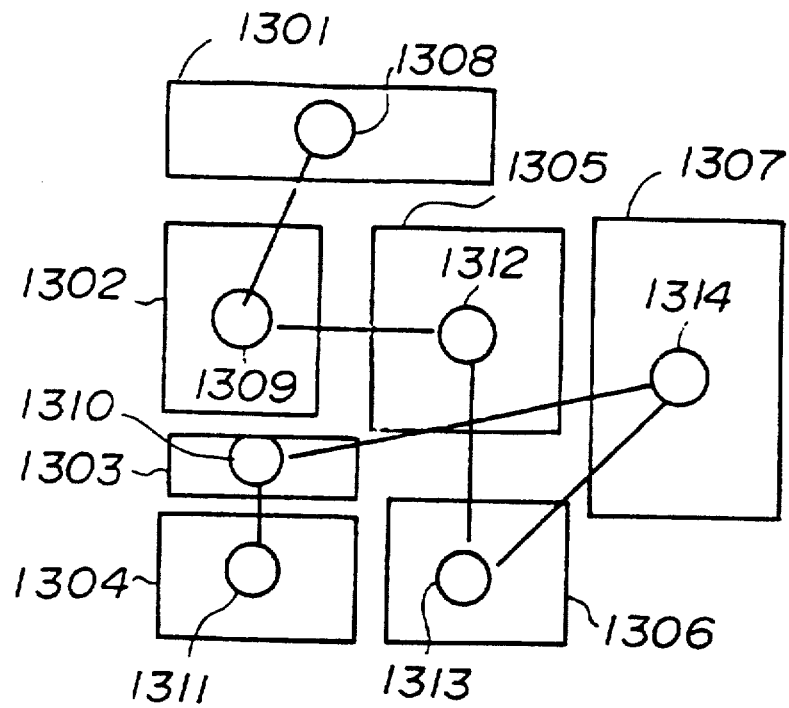
FIG. 13 illustrates reading-order checking operation in the apparatus shown in FIG. 11.

The reading-order checking means 1106 checks the reading order determined by the reading-order determination means 1105 in S1206. This reading-order checking operation is described using the example of FIG. 13. As shown in FIG. 13, the input page image in the example includes ordinary(body)-text regions 1301 through 1307 respectively represented by corresponding contour rectangles such as those described above. In S1203 through S1205, for example of the process, the middle points of the contour rectangles may have been determined as nodes 1308 through 1314 and the nodes may have then been linked so as to represent the reading order.

As shown in FIG. 13, the reading-order checking means 1106 determines that the reading order indicated in FIG. 13 is incorrect because the line provided between the middle points 1312 and 1313 intersects the line provided between the middle points 1310 and 1314.

Accordingly, the reading-order re-determination means 1107 determines another reading order for the same input document page image in S1207 in addition to the precedingly performed reading-order determination step S1205. In this determination, the reading-order re-determination means 1107 considers the positions of the contour rectangles and sorts the contour rectangles in the order such that a rectangle located closer to the top-left is placed earlier. For example, since the bottom of the rectangle 1301 is located above the top of the rectangle 1302 and also above the top of the rectangle 1305, the means 1107 determines that the rectangle 1301 is located higher than the rectangle 1302 and than the rectangle 1305. That is, (rectangle 1301)>(rectangle 1302), and (rectangle 1301)>(rectangle 1305).

Further, since the right edge of the rectangle 1302 is located left of the left edge of the rectangle 1305, the rectangle 1305 is located left of the rectangle 1305. That is, (rectangle 1302)>(rectangle 1305). Determinations such as higher and left are finally used to determine the sorting order. Therefore, a particular determination such as higher or left between two rectangles may not be made strictly. That is, although which of the rectangles 1301 and 1302 is located left of the other is difficult to be determined, since the rectangle 1301 is higher than the rectangle 1302, the sorting order can be determined to be that the (rectangle 1301)> (rectangle 1302). Thus, the sorting order is determined flexibly using the overall rectangle-position relationship. In the example of the above three rectangles, the sorting order is thus determined to be (rectangle 1301)>(rectangle 1302) >(rectangle 1305). However, there is the case where the rectangle 1305 is higher than the rectangle 1303 (thus 1305>1303) while the rectangle 1303 is left of the rectangle 1305 (thus 1303>1305), the results thus containing inconsistency. In order to cope with such a problematic situation, the means 1107 previously defines that a left/right relationship has priority over a higher/lower relationship. Thus, the sorting order for the above two rectangles is determined as (rectangle 1303)>(rectangle 1305). All the contour rectangles representing the ordinary(body)-text regions have been sorted in such a manner.

Figure 14:
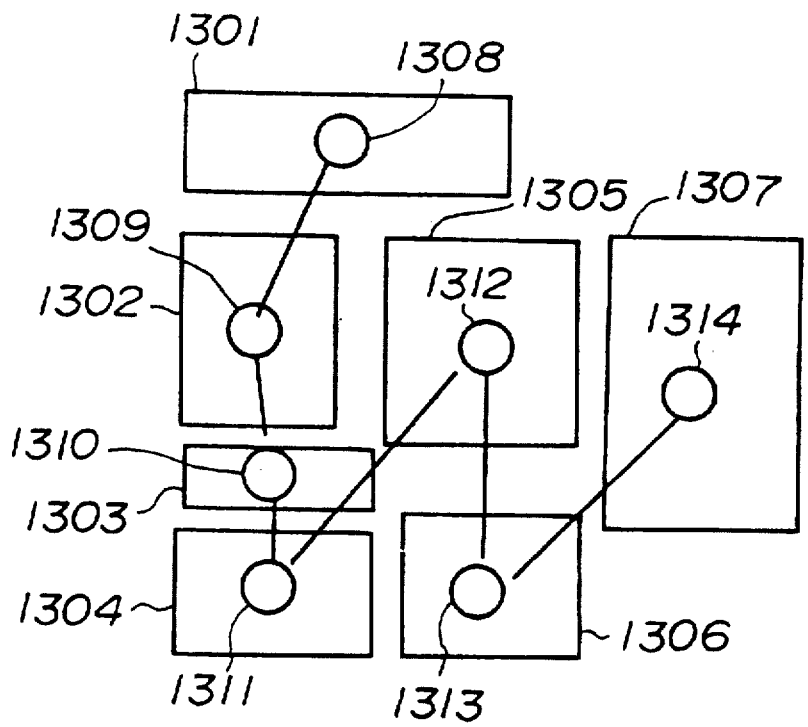
FIG. 14 shows a reading order obtained by a re-determining operation performed due to the reading-order checked result.

As a result of the above sorting-order determination, the reading order shown in FIG. 14 is obtained for the rectangles in the FIG. 13 example.

Figure 15:
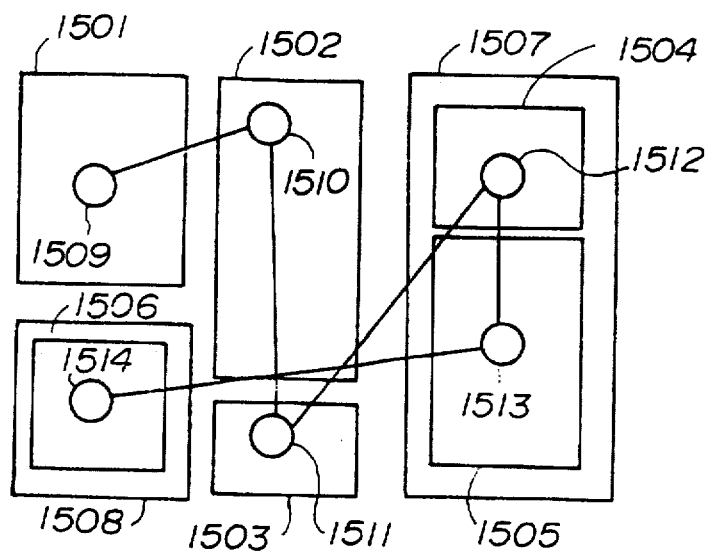
FIG. 15 shows a reading-order example for ordinary (body)-text regions having a box frame.

The apparatus in the second embodiment performs the reading-order checking and reading-order re-determination steps for ordinary(body)-text regions enclosed in no box frame and separately from this process the apparatus performs the same for ordinary(body)-text regions enclosed in a box frame. How the apparatus in the second embodiment processes an input document image including a box frame is now described using a FIG. 15 example. An input document page image in the FIG. 15 example includes ordinary(body)-text regions 1501 through 1506, a box frame 1507 enclosing the ordinary(body)-text regions 1504 and 1505, and a box frame 1508 enclosing the ordinary(body)-text region 1506.

In S1201 through S1205, the middle points 1509 through 1514 respectively representing the ordinary(body)-text regions 1501 through 1506 are determined and the middle points 1509 through 1514 are linked for representing the reading order.

Then, S1206 checks the reading order represented by the links and then detects that the line provided between the points 1513 and 1514 intersects the line provided between the points 1510 and 1511. However, since the 1513-1514 line is a line linking the ordinary(body)-text regions respectively enclosed in the different box frames 1507 and 1508, the 1513-1514 line intersecting the other line does not result in the reading-order checking means 1106 determining that the reading order is incorrect. That is, the means 1106 excludes a line such as that linking 1513 and 1514 i.e. linking ordinary(body)-text regions respectively enclosed in different box frames and a line such as that linking a ordinary(body)-text region enclosed in no box frame and a ordinary(body)-text region enclosed in a box frame, from lines to be checked. In the FIG. 15 example, lines to be checked by the means 1106 are the 1509-1501-1511 lines and the 1512-1513 line.

The third embodiment of the present invention is now described in detail. The apparatus obtains the document information using a technique such as a character reading (recognition) technique. The document-information obtaining uses a reading order of the ordinary(body)-text regions included in an input document page image, which reading order has been determined by a technique such as that used in the above described first embodiment apparatus or that used in the above described second embodiment apparatus.

Figure 16:
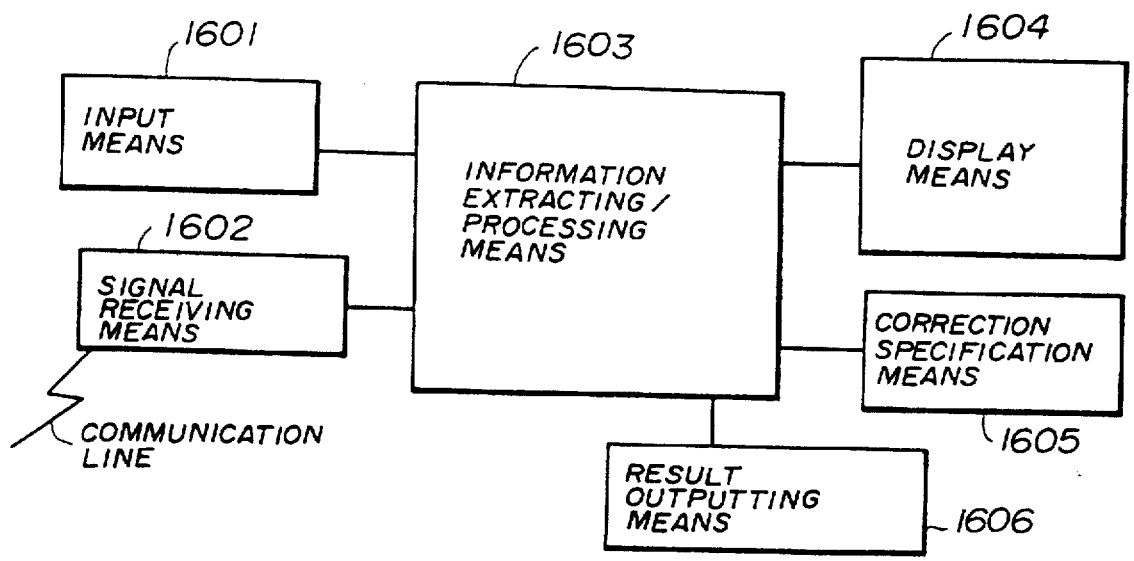
FIG. 16 shows a block diagram of an apparatus in a third embodiment of the present invention.

With reference to FIG. 16, a block diagram of the third embodiment apparatus is now described. Input image data is input through an input means such as a scanner or a signal receiving means 1602 such as a facsimile device connected to a telephone communication line. An information extracting/processing means 1603 has various functions such as a text-region extraction function, text-region separating (classifying) function, ordinary(body)-text-region representing function, and reading-order determining function such as those used in the first-embodiment apparatus described above. In addition, the means 1603 has another function of reading (recognizing) characters in the document and thus obtaining the document information.

A display means 1604 is a display device such as a CRT (cathode ray tube) display device for displaying text regions being handled. A correction instructing means 1605 is a pointing device such as a mouse for an operator to input the correction instructions to the apparatus if the operator has found an error to be corrected in extracted information or the like displayed on the display means 1604. A result outputting means 1606 may comprise a printer for printing the result of the processing performed by the apparatus out on a paper sheet, or storing means for storing the same result on a recording medium in the form of electronic information, or transmitting means for transmitting the same result via a communication line.

Figure 17:
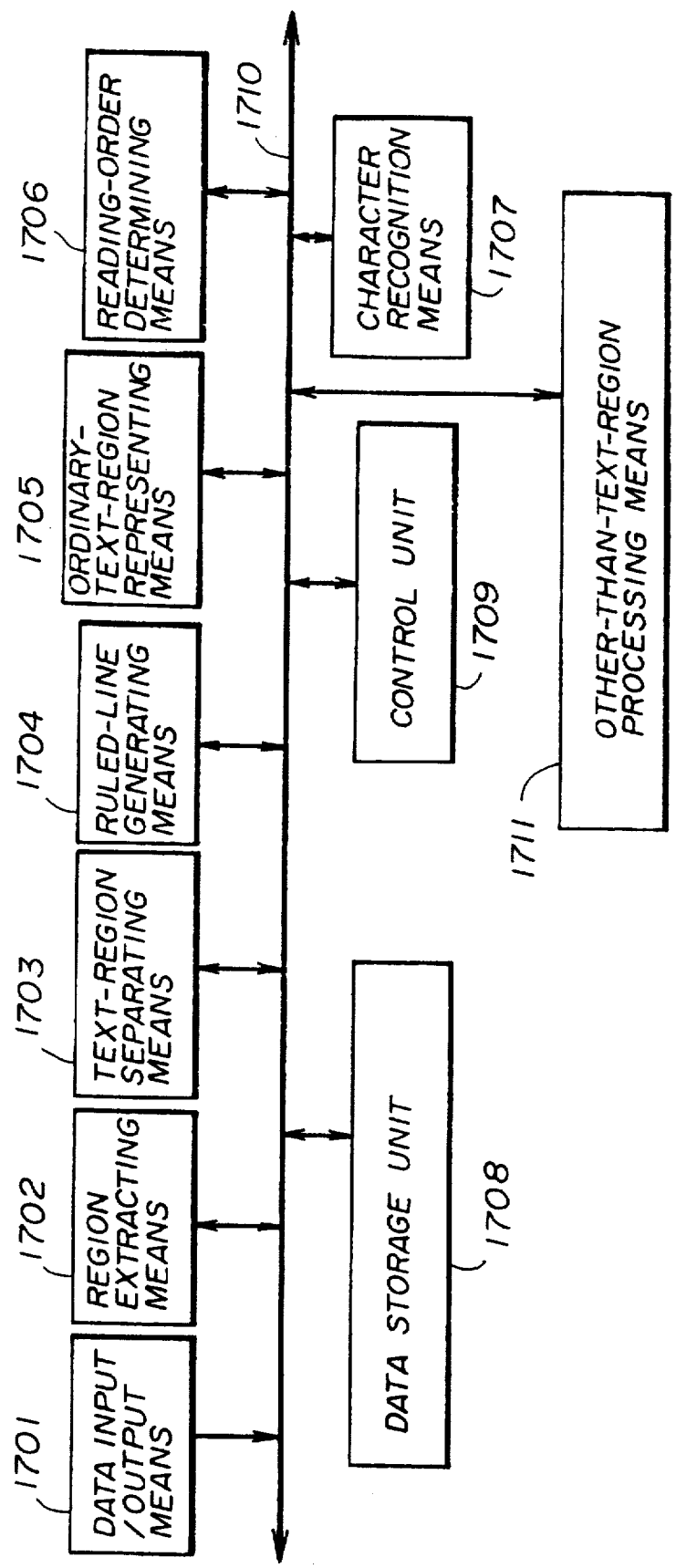
FIG. 17 shows a block diagram of an information extracting/processing means of the apparatus shown in FIG. 16.

With reference to FIG. 17, the construction of the information extraction/processing means 1603 is now described. A region extracting means 1702, text-region separating (classifying) means 1703, ruled-line generating means 1704, ordinary(body)-text-region representing means 1705, reading-order determining means 1706, data storing means 1708, control unit 1709 and data communication bus 1710 have functions and constructions respectively identical to parts 102, 103, 104, 105, 106, 107, 108 and 109 in the FIG. 1 apparatus. In addition, the apparatus in the third embodiment includes data input/output means 1701 acting as a buffer for storing therein input/output data, character reading means 1707 and other-than-text-region processing means 1711.

As described for the FIG. 1 apparatus, the region extracting means 1702 extracts, from an input image, text regions and the special-text regions such as figure regions, table regions and so forth. The text-region separating (classifying) means 1703 separates (classifies) the text regions into ordinary(body)-text regions and the special-text regions.

The ordinary(body)-text regions are then processed by the ruled-line generating means 1704, ordinary(body)-text-region representing means 1705 and reading-order determining means 1706 so that the ordinary(body)-text-region construction is detected and thus the reading order is determined.

The character reading means 1707 reads the ordinary (body)-text regions in accordance with the reading order determined by the reading-order determining means 1706 so as to obtain the document information. The means 1707 also reads the text regions other than the ordinary(body)-text regions so as to obtain the relevant document information. The other-than-text-region processing means 1711 appropriately processes the regions other than the text regions. Concretely speaking, if the relevant region is that of a table, the means 1711 extracts the ruled lines and causes the character reading means 1707 to read the characters included in the table. If the relevant region is that of a photograph, the means 1711 adaptively codes the photograph image by a technique such as the two-dimensional DCT (discrete cosine transformation) conversion technique. If the relevant region is that of a figure, the means 1711 extracts line drawings from the figure image so as to convert the lines into the vectors. Such processing for regions other than the text regions may be performed independently of the processing for the text regions. The apparatus in the third embodiment thus processes various image regions other than text regions appropriately to characteristics of the particular types of image regions. As a result, the operator may use various image regions such as a table, photograph, figure or the like in their optimum forms. Further, the third-embodiment apparatus also extracts information such as a header and footer different from ordinary(body)-text information as described for the first-embodiment apparatus so that the different information may be used as bibliographical information.

Figure 18:
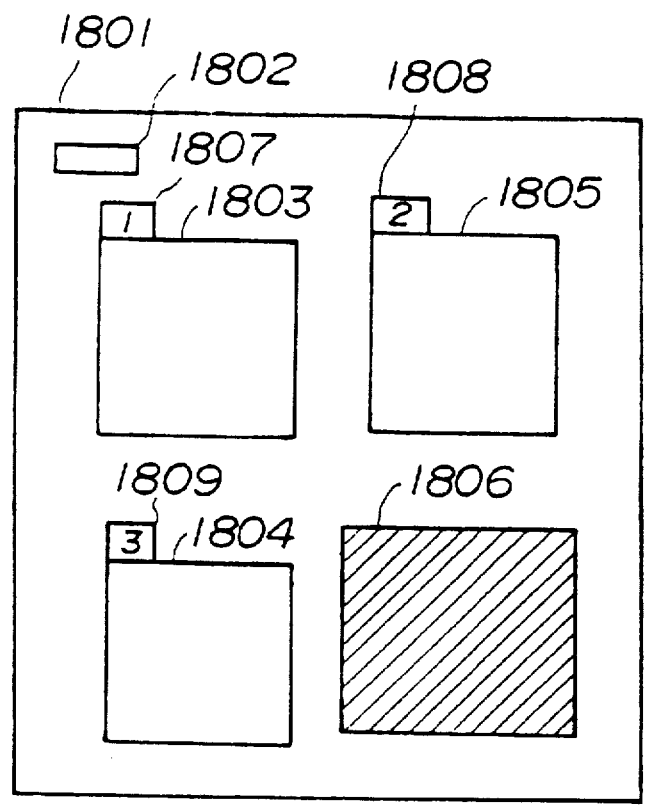
FIG. 18 shows a display example of text regions in the apparatus of FIG. 16.

The obtained document information is then displayed by the display means 1604. With reference to FIG. 18, a display example of text regions is described, the text regions being respectively represented by the corresponding rectangles and numbers indicating the reading order attached to the displayed rectangles as shown in the figure. The document page image 1801 includes a header region 1802, ordinary (body)-text regions 1803, 1804, and 1805, and figure region 1806, the regions being displayed on the display means 1604. The reading-order numbers 1807 (number 1), 1808 (number 2), and 1809 (number 3) are also displayed together respectively accompanying the ordinary(body)-text regions 1803, 1804 and 1805. Alternatively, the reading order may be displayed so that arrows link the ordinary(body)-text regions in accordance with the reading order.

If the operator finds errors such as an error in extracted information or an error in the reading order in displayed information such as described above, the operator may correct the errors through the correction instructing means 1605. The operator may use a mouse which may be provided as a part of the means 1605 so as to change the size of the displayed region and/or change the position of the region in the display, or the operator may use a keyboard which may be provided as a part of the means 1605 to input a new reading order of the displayed regions. After the operator appropriately corrects the obtained document information and then acknowledges the correction being properly performed, the operator then specifies to finalize the document reading operation. Then, the apparatus outputs the finalized information through the result outputting means 1606. Thus, since the third-embodiment apparatus may correct errors if they are present, the proper document information may be efficiently obtained.

Further, the present invention is not limited to the above described embodiments, and variations and modifications may be made without departing from the scope of the present invention.

What is claimed is:

1. A computer-readable medium having stored thereon a plurality of sequences of instructions, said plurality of sequences of instructions including sequences of instructions which, when executed by a processor, cause said processor to:

a) extract text regions from an input document image;
   b) classify said text regions into:
   (b1) in-order reading regions of text which are to be successively read in a predetermined order and
   (b2) different-attribute regions of text;
   c) detect a construction of said in-order reading regions but not of said different-attribute regions; and
   d) determine the reading order, in which said in-order reading regions are to be read, using said construction.

2. The computer-readable medium of claim 1, causing said processor to:

detect said construction in a manner that is the same whether said input document image comprises a vertically typeset document or a horizontally typeset document.

3. The computer-readable medium of claim 1, causing said processor to:

form a tree graph representing said construction including nodes respectively representing said in-order reading regions.

4. The computer-readable medium of claim 1, causing said processor to:

classify said text regions into in-order reading regions enclosed by a box frame which is included in said input document image and in-order reading regions enclosed by no box frame; and
   determine the reading order in which said in-order reading regions enclosed by a box frame are to be read and further determine the reading order in which said in-order reading regions enclosed by no box frame are to be read.

5. The computer-readable medium of claim 4, wherein:

said box frame is formed of four sides consisting of a top side, a bottom side, a right side and a left side.

6. The computer-readable medium of claim 1, causing said processor to:

e) check whether said reading order is correct or incorrect; and
   f) re-determine the reading order if a result of incorrect is obtained.

7. The computer-readable medium of claim 6, wherein said check causes said processor to:

check the reading order, in which the in-order reading regions are to be read, for the in-order reading regions enclosed in a box frame which is included in said input document image; and
   said re-determine causes said processor to re-determine the reading order for said in-order reading regions enclosed in said box frame.

8. The computer-readable medium of claim 7, wherein:

said box frame is formed of four sides consisting of a top side, a bottom side, a right side and a left side.

9. The computer-readable medium of claim 1, causing said processor to:

g) read the characters constituting said in-order reading regions in accordance with said reading order.

10. The computer-readable medium of claim 1, causing said processor to:

detect said construction using imaginary ruled lines, which may be generated depending on contents of an original image and then added to said original image so as to control the detection operation.

11. The computer-readable medium of claim 10, wherein said imaginary ruled lines are generated for blank regions having a predetermined shape/predetermined dimensions and/or for figure/table regions.

12. The computer-readable medium of claim 1, causing said processor to:

detect said construction using scopes of influence, assigned to appropriate regions, for searching subsequent regions; and
    each of said scopes of influence assigned to a respective one of said appropriate regions represents a scope on which said respective one of said appropriate regions has influence.

13. The computer-readable medium of claim 1, causing said processor to:

prevent said different-attribute regions from affecting the determination of the reading order.

14. The computer-readable medium of claim 1, wherein said different-attribute regions include, a series of characters which are provided as footers and/or headers in said input document image.

15. A computer-readable medium having stored thereon a plurality of sequences of instructions, said plurality of sequences of instructions including sequences of instructions which, when executed by a processor, cause said processor to:

a) extract text regions from an input document image;
    b) classify said text regions into in-order reading regions which are to be successively read in a predetermined order and into different-attribute regions;
    c) detect a construction of said in-order reading regions;
    d) determine the reading order, in which said in-order reading regions are to be read, using said construction;
    e) check whether said reading order is correct or incorrect; and
    f) re-determine the reading order if a result of incorrect is obtained;
    wherein said check causes said processor to:
    e1) provide reference points to the respective in-order reading regions;
    e2) connect said reference points in accordance with a relevant reading order; and
    e3) determine said reading order to be incorrect if lines formed as the result of the connection intersect.

16. A computer-readable medium having stored thereon a plurality of sequences of instructions, said plurality of sequences of instructions including sequences of instructions which, when executed by a processor, cause said processor to:

a) extract text regions from an input document image;
    b) classify said text regions into in-order reading regions which are to be successively read in a predetermined order and into different-attribute regions;
    c) detect a construction of said in-order reading regions;

d) determine the reading order, in which said in-order reading regions are to be read, using said construction;

e) check whether said reading order is correct or incorrect; and f) re-determine the reading order if a result of incorrect is obtained;

wherein said check causes said processor to:

e1) provide reference points to the respective in-order reading regions;

e2) connect said reference points in accordance with a relevant reading order; and e3) determine said reading order to be incorrect if a number of intersections of the lines formed as a result of the connection exceeds a predetermined value.

17. A computer-readable medium having stored thereon a plurality of sequences of instructions, said plurality of sequences of instructions including sequences of instructions which, when executed by a processor, cause said processor to:

a) extract text regions from an input document image;

b) classify said text regions into:
  (b1) in-order reading regions of text which are to be read in a predetermined order and
  (b2) different-attribute regions of text;

c) detect a construction of said in-order reading regions but not of said different-attribute regions; and d) determine the reading order, in which said in-order reading regions are to be read, using said construction.

18. The computer-readable medium of claim 17, causing said processor to:

detect said construction in a manner that is the same whether said input document image comprises a vertically typeset document or a horizontally typeset document.

19. The computer-readable medium of claim 17, causing said processor to:

form a tree graph representing said construction including nodes respectively representing said in-order reading regions.

20. The computer-readable medium of claim 17, causing said processor to:

classify said text regions into in-order reading regions enclosed by a box frame which is included in said input document image and in-order reading regions enclosed by no box frame; and determine the reading order of said in-order reading regions enclosed by a box frame and further determine the reading order of said in-order reading regions enclosed by no box frame.

21. The computer-readable medium of claim 20, wherein:

said box frame is formed of four sides consisting of a top side, a bottom side, a right side and a left side.

22. The computer-readable medium of claim 17, causing said processor to:

check whether said reading order is correct or incorrect; and re-determine the reading order of said in-order reading regions using another predetermined procedure if a result of incorrect is obtained.

23. The computer-readable medium of claim 22, wherein said check causes said processor to:

check the reading order of the in-order reading regions for the in-order reading regions enclosed in a box frame which is included in said input document image; and said re-determine causes said processor to re-determine the reading order for said in-order reading regions enclosed in said box frame.

24. The computer-readable medium of claim 23, wherein:

said box frame is formed of four sides consisting of a top side, a bottom side, a right side and a left side.

25. The computer-readable medium of claim 17, causing said processor to read the characters constituting said in-order reading regions in accordance with said reading order.

26. The computer-readable medium of claim 17, causing said processor to:

detect said construction using imaginary ruled lines, which may be generated depending on contents of an original image and then added to said original image so as to control the detection operation.

27. The computer-readable medium of claim 26, wherein said imaginary ruled lines are generated for blank regions having a predetermined shape/predetermined dimensions and/or for figure/table regions.

28. The computer-readable medium of claim 17, causing said processor to:

detect said construction using scopes of influence, assigned to appropriate regions, for searching subsequent regions; and each of said scopes of influence assigned to a respective one of said appropriate regions represents a scope on which said respective one of said appropriate regions has influence.

29. The computer-readable medium of claim 17, causing said processor to:

prevent said different-attribute regions from affecting the determination of said reading order.

30. The computer-readable medium of claim 17, wherein said different-attribute regions include:

a series of characters which are provided as footers and/or headers in said input document image.

31. A computer-readable medium having stored thereon a plurality of sequences of instructions, said plurality of sequences of instructions including sequences of instructions which, when executed by a processor, cause said processor to:

a) extract text regions from an input document image;

b) classify said text regions into in-order reading regions which are to be read in a predetermined order and into different-attribute regions;

c) detect a construction of said in-order reading regions;

d) determine the reading order, in which said in-order reading regions are to be read, using said construction;

e) check whether said reading order is correct or incorrect; and f) re-determine the reading order of said in-order reading regions using another predetermined procedure if a result of incorrect is obtained;

wherein said check causes said processor to:

e1) provide reference points to the respective in-order reading regions;

e2) connect said reference points in accordance with a relevant reading order; and e3) determine said reading order to be incorrect if lines formed as the result of the connection intersect.

32. A computer-readable medium having stored thereon a plurality of sequences of instructions, said plurality of sequences of instructions including sequences of instructions which, when executed by a processor, cause said processor to:

a) extract text regions from an input document image;

b) classify said text regions into in-order reading regions which are to be read in a predetermined order and into different-attribute regions;

c) detect a construction of said in-order reading regions;

d) determine the reading order, in which said in-order reading regions are to be read, using said construction;

e) check whether said reading order is correct or incorrect; and f) re-determine the reading order of said in-order reading regions using another predetermined procedure if a result of incorrect is obtained;

wherein said check causes said processor to:
- e1) provide reference points to the respective in-order reading regions;
- e2) connect said reference points in accordance with a relevant reading order; and
- e3) determine said reading order to be incorrect if intersections of lines formed as the result of the connection exceeds a predetermined threshold value.

33. A computer-readable medium having stored thereon a plurality of sequences of instructions, said plurality of sequences of instructions including sequences of instructions which, when executed by a processor, cause said processor to:

a) extract text regions from an input document image;

b) classify said text regions into:
- (b1) body regions of text which are to be successively read in a predetermined order and
- (b2) different-attribute regions of text;

c) detect a construction of said body regions but not of said different-attribute regions; and d) determine the reading order, in which said body regions are to be read, using said construction.

* * * * *